(12) United States Patent
Motsenbocker

(10) Patent No.: US 10,139,846 B2
(45) Date of Patent: Nov. 27, 2018

(54) DC POWER GRID AND EQUIPMENT

(71) Applicant: Marvin Motsenbocker, Fredericksburg, VA (US)

(72) Inventor: Marvin Motsenbocker, Fredericksburg, VA (US)

( * ) Notice: Subject to any disclaimer, the term of this patent is extended or adjusted under 35 U.S.C. 154(b) by 490 days.

(21) Appl. No.: 14/941,598

(22) Filed: Nov. 15, 2015

(65) Prior Publication Data

US 2016/0141879 A1 May 19, 2016

Related U.S. Application Data

(60) Provisional application No. 62/080,351, filed on Nov. 16, 2014, provisional application No. 62/102,030, filed on Jan. 11, 2015, provisional application No. 62/144,320, filed on Apr. 7, 2015, provisional application No. 62/080,349, filed on Nov. 16, 2014, provisional application No. 62/205,664, filed on Aug. 15, 2015.

(51) Int. Cl.

| | |
|---|---|
| *H02J 3/38* | (2006.01) |
| *G05F 1/67* | (2006.01) |
| *H02J 1/08* | (2006.01) |
| *H02J 3/02* | (2006.01) |
| *H02J 7/34* | (2006.01) |
| *H02J 7/35* | (2006.01) |
| *H02J 1/00* | (2006.01) |

(52) U.S. Cl.
CPC .............. *G05F 1/67* (2013.01); *H02J 1/08* (2013.01); *H02J 3/02* (2013.01); *H02J 7/34* (2013.01); *H02J 7/35* (2013.01); *H02J 2001/004* (2013.01); *Y02E 10/58* (2013.01); *Y02E 10/766* (2013.01)

(58) Field of Classification Search
None
See application file for complete search history.

(56) References Cited

U.S. PATENT DOCUMENTS

| | | | |
|---|---|---|---|
| 5,459,358 A | 10/1995 | Rose | |
| 7,019,507 B1 | 3/2006 | Dittmer | |
| 7,221,106 B1 * | 5/2007 | Nemir | ................ H02M 5/2573 307/132 R |
| 7,800,346 B2 * | 9/2010 | Bolz | .................... H02J 7/0014 320/116 |
| 7,808,219 B2 * | 10/2010 | Ye | ...................... H02M 7/2176 323/224 |

(Continued)

*Primary Examiner* — Lincoln Donovan
*Assistant Examiner* — Khareem E Almo

(57) ABSTRACT

Direct current electric grids are provided that allow independent power generation and consumption at the neighborhood level. In an embodiment power is uploaded and downloaded to each node via monitoring of node voltage and setting high vs low priority loads to optimize for maximum power usage. Embodiments allow a new paradigm wherein electrical supply is set by total available installed power generation and wherein all available power is used, via prioritization. New apparatuses and circuits are provided that provide higher efficiency by utilizing solar power generated at low light conditions and by minimizing the number of power alteration steps between power generator and power consuming device.

19 Claims, 12 Drawing Sheets

(56) References Cited

U.S. PATENT DOCUMENTS

| | | | | |
|---|---|---|---|---|
| 8,374,729 B2* | 2/2013 | Chapel | ............... | H02J 13/0082 |
| | | | | 700/295 |
| 8,938,322 B2* | 1/2015 | Westergaard | ............ | H02J 3/14 |
| | | | | 700/291 |
| 8,975,779 B2 | 3/2015 | Cooper | | |
| 9,088,055 B2* | 7/2015 | Adipietro | ............ | H01M 10/465 |
| 9,172,245 B1* | 10/2015 | Lentine | ................ | H02J 3/00 |
| 9,270,116 B2* | 2/2016 | Adams | .................... | H02J 3/14 |
| 9,360,528 B2* | 6/2016 | Barfield | ................ | G01R 19/00 |
| 9,577,432 B2* | 2/2017 | Li | .......................... | H02J 4/00 |
| 9,588,534 B2* | 3/2017 | Chapel | ............... | H04L 12/4633 |
| 9,692,259 B2* | 6/2017 | Boss | .................. | H02J 13/0062 |
| 9,783,071 B2* | 10/2017 | Gaul | .................... | B60L 3/0069 |
| 9,787,195 B1* | 10/2017 | Xiong | .............. | H02M 3/33507 |
| 2004/0135530 A1* | 7/2004 | Liu | ......................... | H02P 6/16 |
| | | | | 318/400.34 |
| 2006/0229768 A1 | 10/2006 | Chassin | | |
| 2007/0113595 A1* | 5/2007 | Harwood | ............... | D06F 33/02 |
| | | | | 68/12.01 |
| 2008/0140565 A1 | 6/2008 | Debenedetti | | |
| 2008/0310967 A1* | 12/2008 | Franz | .................. | F04D 27/004 |
| | | | | 417/32 |
| 2011/0148195 A1 | 6/2011 | Lee | | |
| 2012/0095612 A1 | 4/2012 | Rivers | | |
| 2016/0365817 A1* | 12/2016 | Schuster | ................ | H02P 23/26 |

* cited by examiner

Bar LEDs to show power from local vs utility

DC POWER GRID AND EQUIPMENT

RELATED U.S. APPLICATION DATA

This application receives priority from U.S. Provisional No. 62/080,349 filed Nov. 16, 2014 entitled "D.C. Power Grid and Equipment," and from U.S. Provisional No. 62/102,030 filed Jan. 11, 2005 entitled "D.C. Power Grid and Equipment," and from U.S. Provisional No. 62/144,320 filed Apr. 7, 2015 entitled "D.C. Power Grid and Equipment," and from U.S. Provisional No. 62/205,664 filed Aug. 15, 2015 entitled "D.C. Power Grid and Equipment" the entire contents of each filing are incorporated by reference in their entireties.

FIELD

Embodiments relate to solar energy and particularly to distribution of energy in electrical grids.

BACKGROUND

Renewable energy such as solar electric and wind power are best generated in a disperse manner, and not at central locations. Furthermore, technology has advanced to the point that most anyone can generate renewable energy at their home or nearby locations and use on site. Such local use would be greatly facilitated by sharing, wherein generated power in a neighborhood were used in a cooperative manner such that excess power not needed at one site could be pooled and used by others in the area.

Local grids solve many problems, such as inefficiency of energy transmission, greater resiliency, relative freedom from government interference and freedom from racketeers, who spend money on favorable regulations to control government and utilities for financial advantage at the expense of a vibrant middle class.

Despite these attributes, the perceived cost and complexity of local grids are very high. As a result, it is expected that individuals will become subservient to utilities even to use their own locally produced power. For example The Economist magazine p. 66 October 18-26 issue of 2014 states: "[b]ringing microgrids to the masses is harder. Capital costs are high. So some utilities . . . now want to provide customers with microgrids as a service." In fact, the freedom available from locally produced energy is in doubt since the large utilities want to control locally produced and consumed electricity. As stated in the Economist: "[b]ig Maryland utilities such as Pepco and Baltimore Gas and Electric are showing interest. The last thing they want is other operators grabbing revenues the utilities view as theirs by regulatory right. They also smell higher profits . . . ." In order to exploit local grids, such outsiders follow rentier profit seeking models taught in business school to maximize their return on investment by owning and controlling power networks used by others.

Another problem is that power grid loads are not controlled by power generation capacity, but oppositely by power demand. Expensive real-time top down monitoring and control systems are required to monitor and predict power use and then to throttle power plant output (typically by changing rate of fossil fuel burning), in response to that demand. The business school model of seeking rentier profits by owning and ladling out resources to captive consumers conflicts with the reality that much power can be produced and consumed locally and that there is no practical upper limit to how power an energy user could consume, if that power were available.

Because of the rent seeking power market model and centralized ownership and control based on accumulation of fiat wealth, existing grids require "large and complex hardware-software systems . . . for real-time operations and control" (see: *State estimation and contingency analysis of the power grid in a cyber-adversarial environment* published at http://csrc.nist.gov/news_events/cps-workshop/slides/presentation-9_berthier-bobba-davis-rogers-zonouz.pdf). Accordingly as described therein present grids require "continuous monitoring and analysis" at a central location and "hierarchical control architecture." Such fragility incurs further expenses in defending from hackers and legal expenses over ownership contests by far away bankers who have no understanding, personal interest or stake in energy generated and used at the local level. Accordingly, making a grid simple, self-regulating, cheap and very efficient would provide immense benefits, not only in making more energy available to users, but in lowering infrastructure costs and resistance to cyber attacks from outsiders.

SUMMARY

An embodiment provides a direct current electric power grid having multiple connection points that sense grid voltage, the grid having a defined target voltage such that when a connection sensed grid voltage is higher than the target voltage the grid condition at the connection point is HIGH and when the connection sensed grid voltage is lower than the target voltage the grid condition at the connection point is LOW; the grid comprising: at each of at least two connection points at separate locations: a high priority load and a low priority load; at least two solar electric power input connection points; wherein when the connection point is LOW the connection point provides power from the grid to the high priority load but not the low priority load, and when the connection point is HIGH, the connection point provides power from the grid to both the high priority load and the low priority load.

In related embodiments, each of the two solar electric power input connection points provides excess power from the respective connection point to the grid; the grid further comprising a defined maximum voltage and a topping load at one or more connection points that consume more power when the grid voltage at a connection point nears or meets the defined maximum voltage to prevent over-voltage conditions; the topping load is a low priority load; the grid comprises one or more microprocessors that manage grid power flow at a connection point by receiving sensed voltage and controlling at least one load; one or more microprocessors controls at least two loads and a power source at a connection point; the one or more microprocessors controls loads and a power source at two or more connection points; the at least two solar electric power input connection points are the same as the at least two connection points at separate locations; the grid further comprises a defined maximum voltage and a non-solar power source at a connection point that turns off or decreases power supply to the grid from the non-solar power source when the grid voltage at the connection point nears or meets the defined maximum voltage to prevent over-voltage conditions; and the topping load is another electrical grid.

An embodiment provides a DC power grid having a characteristic set threshold voltage measurable at one or more locations comprising: two or more solar power connection stations at different locations on the DC power grid, each solar power connection station comprising one or more solar panels that supply power to the DC power grid and a solar DC to grid voltage boost converter that connects the one or more solar panels to the power grid at the connection station based on a comparison of voltage at the one or more locations, and two or more energy user connection stations at different locations on the DC power grid, each user connection station comprising at least one power load that is controlled in response to DC power grid voltage at the connection station.

In related embodiments, the two or more solar power connection stations are at the same locations as the two or more energy user connection stations; the energy user connection station comprising at least one of a higher priority user and a lower priority user, wherein the higher priority user removes power at a lower voltage range and the lower priority user removes power only at a higher voltage range; the energy user connection station further has the condition wherein if the DC power grid voltage measured somewhere on the DC power grid drops below the threshold value during power removal by the higher priority user then the power removed by the higher priority user is paused for a delay period, or decreased or both decreased and paused; wherein the delay period is randomly determined; the delay period is increased when the frequency of DC power grid drops below the threshold value increases; and wherein the high priority user power consumption rate is controlled in response to measured grid voltage changes to maintain the measured grid voltage within a range.

Another embodiment provides a smart DC outlet that protects accidental powering an inductive load from direct current, comprising a power connection for a load a circuit that senses a new connection to a load, a voltage versus current sensor for detecting induction response of the load, that senses a new connection to a load and that is activated upon sensing the new connection, a shut off that interrupts or prevents initiation of power to the load upon sensing an inductive load, and a signaling device for alerting a user that the load is not accepted by the smart DC outlet. In an embodiment at least the circuit that senses a new connection to a load, and a shut off are controlled by a microprocessor. In an embodiment, a voltage differentiation circuit senses voltage versus time upon power connection to a load and a current differentiation circuit senses current versus time upon power connection to the load, from the time of sensing or connecting the load, and activates the shut off if a comparison of differential voltage with differential current indicates a reactive load. In an embodiment, the smart outlet comprises a sensor of voltage, a sensor of current and a microprocessor that accepts input from the voltage and current sensors, and which controls the shut off. In an embodiment, upon sensing a load, the circuit supplies a smaller sensing voltage DC power and after determining status of the load, increases voltage for a normal load usage power.

Another embodiment provides a solar panel boost inverter interposed between a source of solar electric power and a direct current grid connected to that power, comprising a phase width modulation circuit to boost solar panel output from a lower voltage to a higher connected grid voltage, wherein the boost inverter controls at least the phase width, the frequency, or the repetition rate to modulate the output to the grid in response to sensed solar panel output voltage and not sensed load voltage. In an embodiment, solar panel power or ambient light is sensed and the frequency is decreased in response to a sensed low solar panel lighting condition. In an embodiment, solar panel power or ambient light is sensed and inductance used in the boost circuit is increased in response to a sensed low solar panel lighting condition to maintain higher efficiency at low light condition.

An embodiment provides an electric power grid having multiple connection points for receiving power and for delivering power, the grid having one or more defined target voltages, and further comprising at least two inputs for renewable energy power, wherein each renewable energy power input comprises a control circuit between the renewable energy power and a grid connection point wherein the control circuit is controlled to maximize renewable energy power input without regard to grid voltage, and at least one load, wherein the at least one load comprises a circuit that controls load to control grid voltage from exceeding a first defined target voltage, wherein the at least two inputs are controlled to supply maximum power and do not control grid voltage and the at least one load controls grid voltage from over-voltage conditions. In an embodiment the control circuit for each renewable energy power input controls at least one of pulse width modulation frequency, pulse width modulation duty time, and pulse repetition, based on sensed power input voltage or power. In an embodiment, the renewable energy power input is selected from the group consisting of wind power generator, one or more solar panels, water power generator and tide power generator. In an embodiment, the electric power grid comprises at least two loads, wherein a first load is at least sometimes a low priority load and is controlled to maintain grid voltage within a desired range, and a second load is at least sometimes a high priority load that is not controlled to maintain grid voltage. In an embodiment, the load is one or more hot water heating elements. In an embodiment, the at least two inputs further comprise a control circuit that decreases power received from the renewable energy power when grid voltage is over a second defined target voltage. In an embodiment, the second defined target voltage is above the first defined target voltage.

GRID CONTROL BY POWER GENERATION, INSTEAD OF BY "DEMAND"

Figure 1:
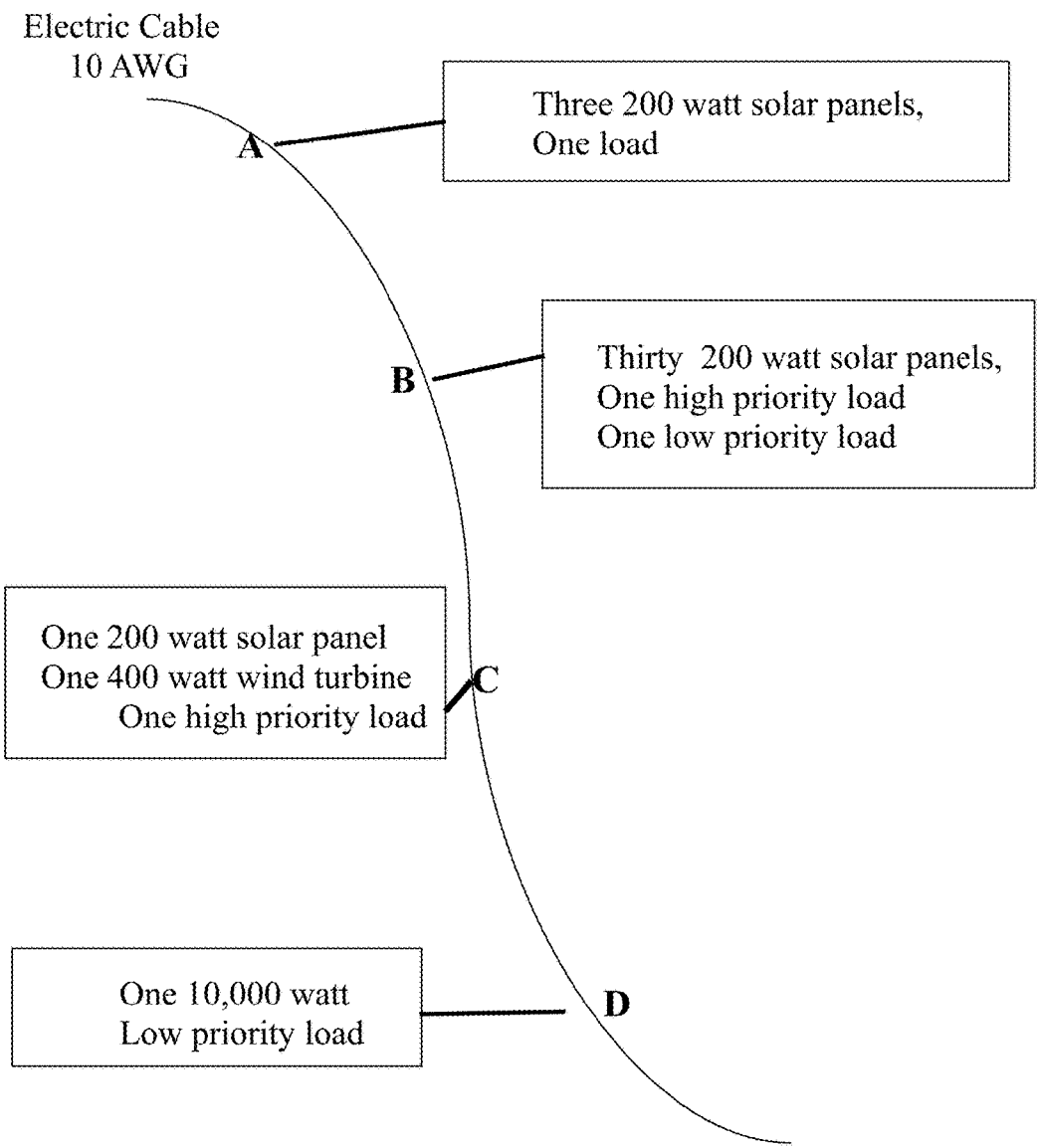
FIG. 1 shows multiple nodes on a representative 10 AWG local grid cable.

In an embodiment, most or all power from a grid or portion of a grid is supplied from power sources that are not throttled back during weak demand but instead working at maximum output. Control is by generation of power and not by demand such that power use is determined by how much power can be generated by solar electric, wind power and the like, and increases in such power determine power consumption, which automatically rises to accommodate increases and automatically decreases in response to decreases in power generated. In this grid embodiment, erratic increases (or decreases) in power production are met with increases (or decreases) in power consumption, based on at least two priority levels of power use, wherein a lower priority load is always available to consume extra power.

Preferably this is automatically done by priority rules and no central control is required. Example of low priority swing loads include hot water heaters, water pumps to water towers, electric heating of floors in buildings (in a cold climate), air conditioning, electrolysis of water, charging of electric or hybrid car batteries, lighting of greenhouses, and even export to other grids or trunk lines outside of the local grid area.

This embodiment differs from existing utility power grids, which instead monitor power usage and respond to changes in power usage or demand by modulating power output from generators that burn fossil fuel. In this embodiment, users are encouraged to own and to supply power from their immediate environment. For example, a user may purchase and install one or more solar panels at various times, one or more wind mills, water power generators, gasoline generators, batteries, or even simply make their electric car battery available by connecting to a local grid node. Power is then used based on how much is available and at what priority. Preferably, all available maximum output renewable power such as solar or wind power is consumed in real time without centralized control, such as by a central administrator that monitors power flux at different locations and gives commands to the different locations and/or to central power generation stations.

DC is Superior for Small Grids

Alternating current power was chosen last century over direct current power because of the greater ease of converting voltage via a transformer. Presently, solid state power devices have eliminated this advantage for local grid power, but not for centrally produced power because the extremely high power switches and controls at and near large power plants preferably are not solid state due to costs. However, locally produced and used power is best with direct current for many reasons. The cost and efficiency of voltage conversion at lower power (1-50 kilowatt for example) is much more favorable for DC compared to A.C. Modern equipment works well, or best on DC and often has to convert A.C. to DC to work. For example transformer-less computer power supplies, including power supplies for cell phones and laptops are DC, do not require A.C. and have to convert A.C. power to DC in order to work. High power consumption devices such as hot water heaters, resistance stoves, induction heating stoves, and cooking grilles work fine on DC if the DC is converted into a pulsing form (such as 100 Hz pulsing DC with 5% or less off time) to accommodate the switches and thermostats. Modern efficient lighting is DC Modern appliances such as heat pumps/air conditioners and power tools are all converting to DC motors for greater efficiency and have to convert their A.C. supplies into DC anyway. A DC power supply can be modified easily to handle most of these applications. Converting a DC source such as solar panel power into A.C., converting the A.C. from one voltage to another, and then converting back to DC generally is much less efficient and much more expensive than simply using the original DC after perhaps one or two voltage conversions using modern solid state buck/boost type circuits.

Existing Utility Grids are Unnecessarily Dangerous

Yet another problem with major utility power is that the utilities (in the U.S. but not necessarily overseas) use earth ground as one side of the power circuit. This is done for several reasons. A practical reason is to have a common voltage reference used to detect faults. A safety reason is that alternating currents induce voltage in nearby metal structures and that grounding them, and one part of the alternating current, minimizes these induced voltages and prevents shock. See for example the explanation by a power engineer at: http://peguru.com/2011/05/ground-grid-design-substation-below-grade-engineering/. "In substations, the high voltage lines carry alternating currents. If you are familiar with Faraday's induction principle, a time varying flux (due to alternating current) induces voltage in an adjacent conductive equipment. This means the steel structures in and around live equipment will pose a shock hazard. Even the fence enclosing the substation will have induced voltage when high voltage transmission lines pass overhead. It is essential to ground all above grade conductive structures to mitigate the shock hazard."

Extensive grounding is required in big alternating power transmission locations because of the alternating current. At the local community level at lower voltage, this grounding is continued and relied on as a reference (called zero volts) and for detecting faults. Also, grounding one side of the electrical grid helps attract lightening by providing a more conductive path to the earth.

However, grounding one side of a electrical circuit over the years has resulted in countless thousands of deaths by electrocution and devices have been invented to shunt lightening to ground (typical lightning arresters and pulse arresters) without having to sacrifice one half of the grid circuitry by making it a target for environmental electron imbalances (static electricity, spikes). Because one side of a power line provided by a utility is earth grounded, anyone who touches the other side of the power line and contacts the earth (by standing on it) can get electrocuted.

In a desirable local grid embodiment, no power line is earth grounded and accidental contact with one side (and not the other simultaneously) will not result in shock or death. For safety reasons, lighting arresters should be installed on a local grid, but such lightning arresters do not need to electrically connect the grid to ground at a low impedance and offer up the grid itself as a target for lightening. In an embodiment a local DC grid is provided that is safer than a utility power grid for this reason. Preferably the local DC grid is NOT connected directly to a utility grid and avoids the grounding safely problems of the utility grid. In an embodiment a utility grid feeds power into a microgrid by an isolation transformer. In another embodiment, a microgrid feeds power into a utility grid via an isolation transformer. In yet another embodiment power is fed either way but monitored with a ground fault interrupter circuit that is set to disconnect the intergrid connection upon sensing a ground fault.

In an embodiment a DC grid is provided that lacks a common voltage reference (earth ground) that is used throughout prior art A.C. grids but instead regulates power by local node monitoring and control. Preferably this control is done by sensing voltage difference between two power wires at each grid connection node and using this relative voltage measurement to adjust by removing power and/or adding power. For example, the voltage difference in a set of power wires appearing at a grid connection is compared with a target voltage of (for example) 240 volts. If the measured voltage is less than the target 240 volts, then the equipment at the connection point can respond appropriately. One response is to shed or decrease a load, preferably in a prioritized manner. Another response is to start or increase production of power and supply greater power flowing into the node to increase its voltage.

Preferably such adjustments are automatic by virtue of voltage differences and Kirchoff's laws. When shedding loads, preferably at least two target voltages or ranges are used for prioritization. Preferably at least two priority types of load (high priority and low priority as a minimum) are used wherein the low priority load is shed or decreased in response to sensing a voltage below a first higher target voltage. A higher priority load would continue but shed (decrease or stop) only after the measured node voltage level drops to a second, lower target value. Preferably these two target levels are effectually close together and the acts take place when voltage drops by less than 5 volts, preferably less than two volts, and more preferably less than one volt, but higher voltage gradations (5-10 volts or more) profitably can be used. Preferably the grid gets most power from solar electric panels but also preferably, the grid further contains power sources, including back up power that can be supplied (from batteries, fuel cells, parked electric cars etc) to handle power deficiencies, preferably in response to a lowered sensed target voltage at the node to which the back up power source is connected.

In an embodiment, the grid comprises two power circuits that are connected at the nodes. Here, one power circuit is used for excess, or temporally changing power (such as solar power) and used for loads that can utilized non-constant power such as water heaters and long term battery charging. The other power circuit is used for high priority loads and has backup power (such as batteries or fuel cells or supplied from a utility grid) available at one or more nodes to keep connected high priority loads fed.

The Self-Regulating Local Grid

A principal problem with a micro grid is controlling the grid voltage. Voltage changes between locations on the grid due to resistance in wire between the points and due to power consumed and produced at different locations. Control of this can be asserted a large number of ways, depending on imagination and how much money and time one wants to spend, and is a good excuse for large banks and other profit minded organizations outside of the community to get involved and to make decisions on power usage in return for rentier income. Large utilities are preparing to produce and sell complicated computers and software to address this issue, as well as to lend money at interest to buy this equipment. In an embodiment, however, a low cost self regulating grid is provided which reduces the need to borrow large amounts of money for local control systems.

As shown in FIG. 1, a local grid comprises a two wire power line that extends in two or more directions and may be branched and/or a long line with nodes. FIG. 1 for simplicity sake shows a long line with 4 connection points A, B, C and D. During the day, nodes A, B, and C provide solar electric power. They may use some or all of their solar power. Any excess is supplied to the grid by virtue of a buck converter or other voltage and power converter that makes current flow to the grid by virtue of a higher generated voltage. For example, each panel, or small group of 2, 3 or 4 panels feeds a buck converter that takes a lower voltage higher current power and converts to a higher voltage lower current power that is set to increase output voltage to the grid until the solar panel maximum output voltage starts to drop below an optimum or set value. In an embodiment, the circuit for doing this automatically is connected to the solar panel and increases output voltage until the solar panel is loaded down to its Vmax voltage or slightly below.

For example pairs of panels with characteristic Vmax in series may total to 58 volts. The inverter (preferably a boost inverter) boosts that power up to a target grid voltage at that local node (increases voltage output, preferably by increasing duty cycle time), loading the panels until the solar panel output voltage drops below the targeted 58 volts level or a distance within 0.1 volt, 0.25 volts, 0.5 volts, 1 volt, 5 volts for example, from this level. By targeting the solar panel optimum voltage level instead of the grid voltage level, we get optimum power from the panels. If the solar panels suddenly increase power output, then a (typically lower priority) load(s) somewhere on the grid will automatically respond by increasing power drawn from the grid. Based on ohms law and kirchoff's law, such load(s) will tend to come from the closest neighbor nodes of the grid and no outside control and payment is required. In an embodiment virtually all power (ie. At least 85%, preferably at least 90%, more preferably at least 95% as measured in watts of peak available power) generated by the solar electric inputs is absorbed and distributed via the DC grid without inefficient conversions to AC power. In an embodiement virtually In an embodiment the locally generated power (such as PV or wind or other) is boosted to a slightly higher voltage when exporting out from the node but is at a lower voltage when used for load(s) at that node. Generally, local load use may be set at a higher priority than export power from the node. This is achieved by a circuit setting or software decision that adjusts the local load to a lower threshold (absorbs power down to a lower threshold voltage) than the node voltage. In an embodiment power generated at a node by for example PV or wind generator is connected to the microgrid node via a circuit that makes the power available to load(s) at that node, and any left over power is absorbed by the node for supply to the microgrid.

In an embodiment, a microgrid comprises two power circuits that accept power and supply power at nodes. A first power circuit connects to low priority load power and preferably various priority load powers. The second power circuit is a constantly available power for devices such as computers and night lighting and has a grid target voltage that is defended by auxiliary power supplies. The two circuits may share a wire in common and the second power circuit preferably has a load sensing circuit breaker or (more preferably a solid state modulating) current controller at each node to prevent any one node from taking too much of the always on power. This second circuit could be for example a neighborhood lighting circuit that provides lights (and cell phone/computer power) at night when solar power, or sufficient power is not available from the first circuit. Each embodiment, including the example of FIG. 1 may further comprise a second (or even more) power circuit(s) to handle necessary low power needs and/or emergency power needs, as a skilled reader readily will appreciate.

In a desirable embodiment, the power transfers in neighboring nodes for the one or more power circuits is monitored in real time, and the data are used for commercial exchange between local users. A node's generation (export) or consumption (import) of power would we recorded. In an embodiment, the cost (in money or other obligation) may be displayed or otherwise signaled to the user or power generator to help with decision making so that they may make appropriate power decisions.

Node A of FIG. 1 has a load that is un-characterized. The owner of that node/location can decide to alter the priority of that load. In an embodiment, the power usage by the load is monitored and an incentive is provided wherein use of power from the grid when low priority devices are off due to low power conditions requires a payment or offset for power produced from that same node A. Node B has a larger solar power array and normally exports power when the sun is shining. The grid voltage at node B will tend to be higher than at adjacent nodes and power will flow appropriately. B also has low and high priority loads that will turn on at local grid voltage node threshold values that are higher and lower, respectively. Node C also includes a wind turbine that has a power controller attached that loads the wind turbine enough to utilize the power. In recent years, small smart turbines are available that will increase power out (generally voltage increased into a low impedance load) in high wind, and decrease loading more optimally in low speed for greater efficiency. These turbines may need available load all the time to handle sudden high wind speeds.

Having a local grid with multiple loads is a good sink for such equipment to dump power into during high wind conditions. This is because in embodiments, the grid responds to increased power with increasing load to keep a target grid voltage in a desirable region. This is important for a wind turbine (unlike a solar panel) because in most devices, when the wind blows, the generated energy has to be consumed for proper torque and resistance, as otherwise the blade may spin too rapidly. Node D of FIG. 1 has a low priority active load that turns on and off and or modulates its use of power in response to relative voltage at node D. The threshold voltages set at node D may be lower than the threshold voltages at other nodes because D is further away (more voltage drop between generators at A,B,C) and a voltage drop in the grid segments will increase with increasing power draw into D. In an embodiment, the threshold values for switching priority loads are adjusted to compensate for these grid segment voltage drops. For example, current flowing in segment C to D is measured, and represents lower supplied voltage with increasing current flow. The threshold values used at node D to decide when to switch on lower and higher priority loads are adjusted downwards.

In an embodiment, because node D is a major percentage of the swing load (load that prevents too high voltage), the target voltage at node A may be set higher than at B, or C or D. In an embodiment, the total range of such kind of adjustments, (both higher and lower) is kept within a set value such as for example, within 2% of the nominal grid voltage, 5% of the nominal grid voltage, or 10% of the nominal grid voltage. The actual value is determined from the maximum voltage drop in a segment.

Voltage Drops Between Nodes

In an embodiment, the difference in target voltage used at one node versus another is determined by the voltage drop between the nodes and also preferably factored by the relative movement of power. For example, if all of B's power output goes to C, then B's node target voltage should be increased (by for example between 0.1 to 1 volt, 0.5 to 2 volts etc. depending on the wire resistance between nodes. For example if 5 amperes flow through a segment is needed and the segment resistance is 0.5 ohms, an increase of about 2.5 volts may be required, assuming that the extra current will be consumed at the other end of the node after flowing through the entire segment. If consumed further away, a higher voltage may be calculated based on arithmetic of ohms law and kirchoffs law as a skilled artisan will appreciate. A mathematician can derive formulas for deciding how much, based on how much current flow is involved, since the voltage drop along a wire often can be expressed as a product of current flowing in the wire and the resistance of the wire. This relationship can be used to adjust target voltage by sensing or inferring current between nodes and voltages at the nodes.

Adjust Node Voltage for Import and Export Control

In an embodiment a user at a node can set a higher or lower node threshold value depending on whether he wants to export or import power, or export or import a given amount of power. The actual value of power in this context can be determined, for example by knowledge of the DC resistance of wiring from that node to other nodes such as a nearest neighbor or such as a known nearby power consumer or generator as described above. To overcome an expected 2.5 voltage drop for sending 5 amps over a 0.1 ohm resistance wire, the local node of the sender can be adjusted 2.5 volts up. In a more practical embodiment, the node could be adjusted up just enough within a range such as between 104 and 112 volts until 5 amps flow out of the node. Similarly, the node voltage can be adjusted down to import current flow within a grid voltage range of for example 104 to 112 volts.

In an embodiment a user can select between a. isolation from the grid or b. connection to the grid by a hand switch or other control. In a more desirable embodiment the user selects either a. isolation from the grid, b. export power to the grid, or c. import power from the grid. In an embodiment a selection to export power results in an increase in the local node voltage and a selection to import power results in a decrease in the local node voltage. The actual increase or decrease can be calculated or empirically determined by gradually changing until the desired current (input or output) is achieved or until a limit (such as node voltage extreme limit) is reached. For example if there is no demand for the excess current to sell, then even a high node voltage may not help and if there is insufficient available grid power, even a low extreme limit node voltage is insufficient to draw in the desired power. In an embodiment a power box has a three way switch labeled "disconnect" "sell" and "buy" (or something analogous) respectively. In an embodiment the switch selection box includes a visual output showing the accumulated power sold (or purchased) and also may include a visual output showing relative or absolute instantaneous power being sold or purchased.

Solar panel buck/boost voltage In an embodiment described by Mark Khusid, an MPPT controller accepts solar panel power input and outputs a local grid voltage. The local grid voltage regulation value may be determined by hardware, software, internet based instructions or the like. For example if a user wants to sell excess solar energy to the grid and is separated by a long wire from a buyer, then the MPPT controller can adjust the output voltage higher to achieve the export. In an extreme case, the consumer of the energy may be a few nodes away and separated by an usually high resistance. In this case, a trunk line or other long distance power carried may be used. For example, the output may enter a 300 volt, 1000 volt or higher trunk grid and supply power to a far-away location to overcome resistance in the local grid network.

Local Grid Connection Box In an embodiment each user has a basic grid connection box. Other boxes such as described in FIGS. 8-12 can connect to the local grid via the grid connection box. Preferably the local grid connection box is mounted to the outside of a building in a weather proof configuration and contains one or more other components such as a. sensors for repeated measurement of voltage and current though the box to/from the local grid, b. power usage recording device such as a downloadable memory that records voltage and current at periodic intervals, c. internet connection, d. cell phone connection to report power usage and/or offers and acceptances for power sales and use with other grid members, e. sensor/tester to determine resistance to the adjacent connected node and f. automated current governor that prevents overload of grid connection wires by monitoring current and limiting current from the node via PWM decrease in duty cycle or other limiter.

A recommend line resistance monitor is the following. A node (A) that connects to an adjacent node (B) via a two wire pair can probe the round trip electrical resistance to the adjacent node by sending a non-DC signal such as for example a 1 kilohertz sine wave. A generator of the wave creates a known voltage signal at node A and the signal travels to and from node B via the two wires. Node A measures the current flow of the known voltage signal and measures the resistance by comparing current with voltage. A variety of permutations can be done to probe with an alternating current signal but low frequency (less than 100,000, preferably less than 40,000, preferably between 100 and 10,000 hertz is preferred. A sine wave of 1000 hertz can be impressed onto the DC power wires and a simple 1000 hertz filter used to sample the 1000 hertz current. By knowing at least the voltage or current at node A or B, and measuring the other parameter, the resistance can be determined both by nodes A and B. The resistance value can be used to set higher or lower local node voltage to accommodate desires to import or export power, preferably based on a. desired current flow, and b. measured resistance. This is because the voltage drop to exchange power is dependent on the actual current flow.

A recommended power monitor device is the following. Each node has a current sensor and voltage sensor. Voltage and current sensed signals are digitized and stored with time stamps (or other indexing to indicate time) on a memory device, preferably a USB stick in the node box. A maintenance person visits each node periodically and inserts the USB memory stick into a reader to download the data. A central computer accepts data from multiple nodes and determines power flow usage. This allows determination of buyers and sellers and differential pricing based on time of use.

A recommended automated current governor device is the following. The node connection box has a current sensor for current passing into or from one or more wires that extend to the local grid. The sensed current is compared with a reference. If the current approaches and/or meets a maximum allowable value then the current becomes interrupted by increasing duty cycle of a series connected power switch such as a MOSFET. Normally the MOSFET is constantly on, but is repeatedly turned off for short periods, preferably with a PWM controller as current reaches undesired levels. Preferably large capacitances of at least 100 uF, preferably at least 1000 uf, more preferably at least 10,000 uf and more preferably at least 100,000 uf are connected to the output of the MOSFET to remove high frequency components of the switched power.

Signal Control from Power Generator to Increase Load

In another embodiment, load turn on or increase is achieved at least in part, by a solar or wind generator (or other generator) generating a signal indicating extra power is available that can be used. For example, a circuit (which can comprise at least in part a microprocessor) that monitors solar electric input and load can detect when the solar panel has more potential power (or near this condition) than is being used.

One embodiment of this is when the output (loaded) voltage of a solar panel is higher than a maximum power point but the load voltage or connected node voltage is already high because of insufficient load from the grid or local equipment (attached at the same node as the generator). The circuit recognizes that more available power can be had and sends a signal indicating that more load is needed to optimize power output. The signal can be generated a number of ways. In a completely hardware embodiment, a PWM generator that controls loading of the solar panel 1. detects with a $1^{st}$ comparator whether the solar panel voltage is too high, and detects with a $2^{nd}$ comparator whether the load output voltage or power from the panel or attached node is too high. If both comparators show high, then a signal (which may be binary or can be proportional to the imbalance) is emitted.

The emitted signal preferably is carried as an RF signal on the grid itself, but other methods are possible, such as over a wi-fi or simple low frequency connection. In an embodiment the signal is used at the generating node itself to set the node voltage at a higher level. In an embodiment the signal is used to set priority of one or more loads in neighboring nodes. For example, signal that higher power is available in one node can be received in nearby node(s) whereupon a download box or circuit can adjust priority to take advantage of the available power. In an embodiment this condition triggers a special payment schedule wherein a lower payment is made for accepting the available power.

In an embodiment, a drift in a neighboring node voltage higher itself is a signal that more power should be taken, by increasing load of that neighboring node, thereby lowering the node voltage down again.

In an embodiment the signal/and or other power information signals are generated and transmitted wherein the grid further comprises its own communication net with each electrical node acting also as a node on the net. Preferably a router is used at each node. Preferably TCP IP is used for formatting messages. Such signal preferably provides information regarding at least one of how much power, from where, and for how long the condition may be expected to last. This allows neighboring nodes to turn on or turn up equipment of commensurate power and minimum time requirements.

Grid over-voltage is prevented, in an embodiment, by having at least as much low priority or active-control loads available as the amount of possible excess electric power such as solar electric energy and wind power or other if available, supplied to the grid. Active-controlled means that the load is turned on (or increased) in response when grid voltage is above a set value or in response to a signal such as described above. An active controlled load can be for example, a hot water heater, multiple hot water heaters (acting independently) at different grid nodes, a water to hydrogen/oxygen electrolysis unit, electric heaters within thermal masses such as concrete or building floors (used for winter), air conditioners (used for Summer), water pumps and the like. Each such active-control load at each of a variety of nodes acts independently to control the voltage at its respective node by turning on or increasing load in response to increased sensed relative node grid voltage (voltage between the two power line pair at the node). As experience is obtained with this system, additional fine control can be had by communication between nodes and between loads and power sources.

In an embodiment, a new member to a microgrid system is allowed without special infrastructure by a requirement to provide a low priority load that can consume at least as much power as an electric generator from that new member. Further, the low priority load should be available to consume any excess load that cannot be accepted by the grid node without exceeding the maximum grid node voltage. For example, a new user presenting 10,000 (maximum rated) watts of solar panel electricity may want to add a node (or connect to an existing node) and can only do so if the new energy is balanced by a equal or greater sized automatically switched load (or a neighbor load exists to take up the imbalance of extra presented power).

In an embodiment, a kit is provided that allows addition of a node. Preferably the kit includes an upload unit and a download unit, which may be separate boxes or may be in the same box for convenience. The upload unit preferably connects solar electric to the node via forward feed voltage regulation. In this case, when the solar panel voltage output drops below a threshold determined by the solar Vmax then the solar panel output is more lightly loaded by for example decreasing duty cycle of a connection to the solar power input. The power download unit senses the node voltage and downloads power to a connected load when the sensed node voltage is determined higher than a threshold but decreases or stops download to the connected load when the sensed node voltage is determined lower then the threshold.

Of course, variations on this theme are desired, such as decreasing when the sensed load is equal to or lower than the threshold. The threshold can be modified based on weather conditions, time of day conditions and user request conditions. A user may schedule (and even agree to pay for to other providers on the grid) download power for a certain time, at which his local node threshold desirably would be set lower to ensure power flow to his node. The node threshold can be automatically set at higher voltage in cold temperatures or in Winter to better harvest energy from solar panels which have higher Vmax in cold conditions. This is particularly preferred when the node voltage is near (preferably slightly less than such as 0-1 volts, 1-5 volts lower) the connected solar electric power connected. This allows higher efficiency and lower cost for systems such as 108 volt systems wherein groups of solar panels can be added by connecting directly to an upload unit.

In an embodiment a kit comprises at least one upload unit and at least one download unit and optionally, connection wire. An attached battery and other capabilities may be included as described herein.

In this and other embodiments, each node preferably has a minimum threshold voltage below which loads are shed, and a maximum threshold voltage above which low priority loads are turned on. In an embodiment, an intermediate threshold node voltage is used for differential control of lower versus higher priority loads. Below the intermediate threshold (but above the low threshold), higher priority loads are activated and above that level lower priority loads added. In practice, additional threshold voltages can be used and preferably each is used as set points for modulating loads such that loads are not suddenly turned on and off at these levels. For example, during summertime, a DC compressor pump on an air conditioner can be continuously adjusted based on voltage difference from the threshold voltage and during wintertime an electric heater can be continuously adjusted based on voltage difference.

Intelligent Grid Networks

In a most desirable embodiment the grid is plastic and self organized. A new user can join by adding wires to the existing wire anywhere, and participates in energy generation and usage by proper selection of threshold voltages at the new node. In an embodiment, a node voltage range from V1 to V2 (encompassing mean grid voltage) is set. When sensed node voltage V is below V1, a low priority load such as a water heater or air conditioner is turned off or turned down until the voltage enters the range again. Likewise, when sensed voltage is above V2 the low priority load is turned on or turned up until the voltage enters the range again. Control thus is asserted automatically by the rules of ohms law and kirchoff's law.

In a desirable embodiment, the power nodes use rules from Ethernet networking, as for example described in wikipedia.org/wiki/Ethernet, the contents of which in this regard are specifically incorporated by reference, particularly pertaining to wired networks. In an embodiment nodes of an electrical grid send power to each other in two directions on power lines analogously to that of nodes of an ethernet, which "communicate" to each other by sending packets in two directions on a wire backbone. One or more rules for handling filling of the wire capacity for information are followed for handling the maximum use on the power lines connecting nodes. For example, collision avoidance rules are particularly useful for handling the problem of two power users with incompatible needs (with respect to power line capacity, power generating capacity and/or power usage capacity) trying to access the same grid and use that same lines.

Schemes such as CSMA/CD, token ring and token bus may be used to manage power use by multiple users on the same grid. In an embodiment, the IEEE PoE standards, or a derivative thereof, provides signaling between power source equipment and power user equipment. This is best carried out on a separate higher priority power line that accompanies a lower priority, power grid as described herein having more variable power levels. See for example wikipedia.org/wiki/Power_over_Ethernet, the contents of which specifically are incorporated by reference herein. In an embodiment, prioritization of users of the grid is carried out using one or more algorithms developed and used for prioritizing internet communications with respect to a power path, which can be represented as a portion of the grid between two nodes, or larger portions treated as a single unit.

In another most desirable embodiment, each node senses other nodes by a near-neighbor analysis similar to that used by router networks. In the latter embodiment, each node has a transmission/receiving device that responds to interrogations by answering with a report of its loads, and power sources. The device could be for example, a cell phone, an internet linked computer, or more preferably an intranet, with a microprocessor at each node to keep track of the other nodes and their load and power generation characteristics. The communication between each power node could occur via a separate twisted wire pair, through radio frequency energy placed on a power line, or other, as a skilled artisan will appreciate. In an embodiment, only the loads at each node are recorded in a manner analogous to the recording of maximum data flow through a node or an individual path used for internet routing of signals, where a high bandwidth signal faces a choice of routes.

Preferably, each node keeps a list of the other nodes, their connections and their power characteristics (at least loads) in a microprocessor accessible memory at the each node. Also preferably, this information is matched up with power handling transmission capability between nodes. The same algorithms used for network discovery and routing as described in www.wikipedia.org/wiki/Routing are used in embodiments and space limitations prevent exhaustive repetition of what a skilled artisan already knows and determine. Also, most specifically incorporated by reference in its entirety is Dijktstra's algorithm, which can be implemented by providing alternative power distribution paths to a given user.

For example, a complicated mesh microgrid network is contemplated wherein a power generator has multiple possible routes to send power to a particular power user. In addition to local near neighbor grid nodes, special independent power lines, which may be leased are may be available for more distant power transfers. Such trunk lines preferably are connected at their own nodes and may connect more than one node from the same vicinity by virtue of their greater current carrying capacity. DC power switches may be activated in on-off and also continuously varying manner to throttle current from specific connections and regions to another according to contracts, which may be executed by automatic programs in a manner analogous to that used for purchasing internet traffic flow.

From standard network discovery techniques described in these references, the additional information of power available at each node, and power loads at each node are included. Then a best route or combination of routes for delivery of power is chosen based on standard router techniques, wherein transferred power (such as kilowatt units) replace megabytes of information in the standard algorithm. In a most preferable embodiment, however, each node queries at a fast enough periodicity to monitor power flow in real time and updates its list of routes based on available transmission capability for each route. For this purpose, the real time power flow through each connection preferably is updated at a rate that can catch slow changes in sun shine and changes in wind speed, which can dominate power sources in a renewable power microgrid.

Accordingly, the microprocessor at each node reports its power flow in real time, although a skilled artisan will appreciate algorithms for analyzing history of power flow at each node to get a more precise reading on which path to emphasize. In this case, the power transmission capability and also cost, for leased lines between each two sets of nodes preferably is compared with real time measured power between those each two sets of nodes for a determination of which route(s) to use for power flow. Again, the routing of power flow preferably is done by activating direct current switches, both as cutoff and by modulation of duty cycle for power admitted through a node-line connection mediated by the DC controller.

Selection of individual and/or multiple concurrent paths for power flow through the microgrid mesh can be made by adjusting target threshold power at each node to modulate the power flowing through that node by switching through alternative power lines, or by other techniques such as switching one or more power connections at a single node. For example, if one node is connected to 3 other nodes, a separate power device such as a MOSFET can be used in each connection for connecting (and modulating power to) the three neighboring nodes. The power device is activated to selectively block, or to regulate flow to or from that neighboring node. The term "regulate flow" includes for example, duty cycle control in a pulse width modulated circuit to increase and decrease power flow as needed. In an embodiment, the microgrid comprises a computer network of routers that keep track of flow through each node to prevent overload of wires between nodes in the same manner that information is routed through an network such as the internet.

In this manner, a new user can join or leave the microgrid system by connecting to the power wires and connecting its controller, and the grid adapts without using a central controller.

Solar Feed Connections to the Grid

In an embodiment, solar electric power supplied at various locations is voltage matched via a connector circuit with a target grid voltage and the solar panel (panel means one or more panels or other combinations of solar electric generating devices as used herein) is increasingly loaded until the solar panel voltage drops below a set threshold. The set threshold generally is the Vmax for the panel (one or more panels in series or parallel having an optimum voltage for the group is included here).

Preferably a boost converter is used between the panel and the grid node and having a duty cycle that increases with increasing panel output voltage. Instead of sensing increased output voltage to set a lowered duty cycle for regulation (decrease duty cycle when above a target output voltage), input voltage is sensed and used to control duty cycle in an opposite manner as follows: as input voltage from the solar panel increases, duty cycle increases to maintain a desired target input loading output voltage from the panel. This opposite relationship to the normal control of a boost converter is unusual and provides the ability to harvest the most energy regardless of grid voltage status. This is made possible by the fact that any grid over-voltage is taken care of/prevented by the active load (including low and high priority loads, and additional priorities as may be desired). In an embodiment, the target input voltage is determined by an MPPT circuit strategy as is known in the art. For example, a controller can vary load to the solar panel and determine which load voltage level provides maximum power output.

In an embodiment, the connector circuit disconnects the solar panel or decreases power supplied by the solar panel in response to a sensed grid over-voltage condition, in which case the solar panel is not loaded to the solar panel's maximum power point. Preferably, however this condition is prevented or quickly resolved by signaling other nodes the availability of extra power. Typically, such signal (either its content or circumstances such as timing) indicates that the available power is low cost, or even free.

Load Connections from the Grid

Preferably DC electric energy from the grid is converted into pulsing DC form so that regular switches and breakers and thermostats can work properly without becoming welded shut from the high DC currents. Preferably a high current load having such switch which is designed for A.C. Loads is connected to the DC grid via a phase width modulated pulsed signal of at least 10 hertz, preferably between 25 and 500 hertz and preferably between 50 and 200 hertz with a short off time duty cycle. In an embodiment for low priority loads such as water heaters, electric heaters and even some air conditioning DC pumps (which normally modulate between 40% and 100% power anyway) the duty cycle is controlled in response to grid voltage, so that power supplied to the load adjusts to help maintain a suitable grid voltage.

Low current loads (which are often high priority and may be serviced by a separate wire pair) preferably are not so modulated. Examples of low current loads include computer, printer and monitor adapters (which don't use traditional transformer voltage conversion), which can be directly plugged into DC voltage. Other low current loads can include lights, and battery charging. In an embodiment, low current loads less than 3, 2 or in some cases no more than amp (preferably between 50-200 volts) such as a cell phone charger, lap top computer, LED lighting, and the like are supplied with constant current DC power. High current loads that have mechanical thermostats or other switches preferably are supplied with pulsing DC to protect those switches.

Back Up Power, AC Plus DC Grid Power

In an embodiment, a node comprises a back-up power such as a battery that evens out the power by storing power from that node (or importing low priority power into the node for storage when available). The back up power can be used at the node or seamlessly supplement or supply constant on devices via its own wire pair on the grid.

In an embodiment however, both AC and DC power are supplied on the same wire or wires. The AC component can be separately added and removed as a skilled electronics engineer readily will comprehend. For example, an AC signal of 25,000 hertz carrying always-on power at low level (for communications equipment or LED lighting etc) can be superimposed onto a DC current carrying wire. A node can download and harvest energy from the 25,000 hertz signal by running the power through a DC blocker (or 25,000 hertz filter) and then rectifying the AC signal to produce a DC power for the always on backup power. In an embodiment this is more easily achieved by using a higher frequency in the range of from 25,000 to 100,000 hertz. Higher frequencies are possible but tend to emit progressively more RF energy contamination into the surroundings.

In an embodiment a lower frequency is used but this may require lower frequency blockers to keep the low frequency energy out of the DC downloading equipment. In another embodiment that takes advantage of earth ground, a DC power is supplied through two wires, neither of which are connected to ground. One of the wires then has AC applied between that wire and ground to create an AC power that is kept separate from the DC power. In this latter embodiment, a low frequency of 50 or 60 Hertz is preferred when the use desires to exploit low cost existing hardware manufactured for AC. This latter embodiment is particularly preferred between two or more nodes that already share a good ground connection with each other by existing wires or pipes or other conductive path.

In another embodiment suggested by M. Osaka, existing infrastructure such as phone land lines, DS lines, or other wires between apartments or houses and the like can be used to transmit power. Although such lines are limited in power handling, they can provide special high priority functions such as low power LED lighting at night, laptop computer power at night, and even battery charging at night, wherein a low power (such as 10 watts or less, 5 watts or less) can be transmitted over the existing infrastructure for long time periods. In an embodiment, a voltage of 50 volts or less, or even 35 volts or less (which are considered safe voltages) is used to share power as described herein between nodes in a city, which can be located in separate houses or even apartments. In an embodiment 120 mA (typical usage limit of land-telephone wires) is used at 48, 50 or 56 volts or less. In an embodiment, this DC power is used to provide neighborhood emergency communications power while the line is simultaneously used to conduct high frequency signal power for communications. In an embodiment this line is use to supply TCP IP formatted communications between nodes of a micro power grid.

Battery Integration

In an embodiment a battery is included at a node and charged with power obtained locally at that node, or from the grid at that node, at a lower priority compared to a higher priority load. An example of a higher priority load in this context can be a user switched device such as an appliance (radio, air conditioner, coffee pot etc.), a computer, lights, or cell phone charger.

In an embodiment, current flow from energy generated from a solar panel is detected and charging current is not supplied to a battery until a minimum threshold solar output current is reached. For example at low light levels (early morning, later evening, or during overcast conditions) current may be 3%, 5%, 7% or 10% of maximum and should be used for high priority loads. Batteries should be charged during high light conditions (preferably at least 20%, 25%, 33%, 50% or more of solar maximum) and should not compete with high priority loads. In an embodiment, battery charging current similarly is limited to avoid competition with other loads and to maintain higher efficiency of charging. Both of these embodiments may be implemented, for example, by measuring current with a hall effect sensor or a series resistance. Preferably a 0.01 ohm or similar low value is used in series to generate a small voltage, which is amplified and compared with a reference to output a threshold signal to a microprocessor or other circuit that turns on, turns off, or otherwise modulates power supplied to the battery. Preferably charging power to the battery is only turned on at a minimum solar panel current threshold of at least 5%, 10%, 25%, 30% or more of the rated maximum output of the solar panel.

Low Light Scavenging Circuit

Many existing installations include solar panels with inverters and chargers that efficiently cannot use solar energy output at low light (eg. less than 7%, especially less than 5%, 4% or 3% of solar maximum) conditions. In an embodiment, a circuit or apparatus as described herein is combined with such installation in a way to activate at low light levels and scavenge the lower energy outputs that otherwise are not being used.

In an embodiment, a circuit is provided that is interposed between solar panels and the other installation equipment. Preferably this comprises a hall-effect current sensor or series resistance current sensor such as a 0.01 or 0.001 ohm resistance that detects the amount of current supplied by the solar panels to the other equipment. A comparison is made and if the current is below a level (such as 5% of solar maximum conditions) then the other equipment is disconnected from the solar panel and the solar output is fed instead into a local grid, or used as described herein to charge a battery, contribute to powering an appliance, lights, or the like. Preferably, the low level power is used directly for an appliance without any buck, boost or other voltage conversion.

Figure 2:
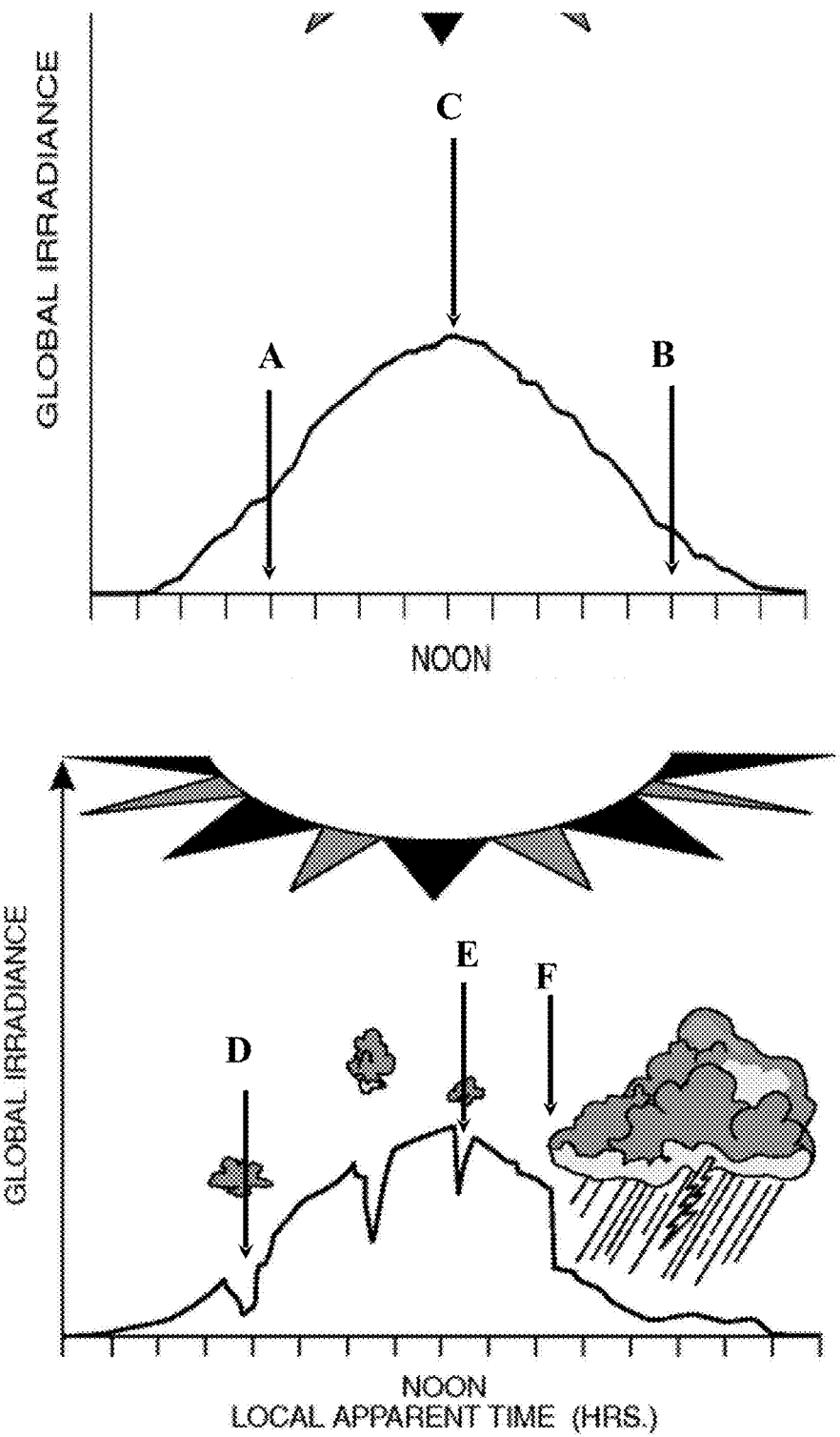
FIG. 2 shows representative effects of daily time and weather on solar energy input.

FIG. 2 depicts solar panel output from typical crystalline panel throughout the day. Before point A (typically before 8 A.M.) and after point B (typically after 5 P.M.) many solar installations ignore the panel output or uses the output with very low efficiency. An embodiment harvests energy during these low light conditions (and overcast weather low light conditions) by, for example, switching out the regular installed solar usage equipment and switching in to one or more circuits as described herein. This embodiment is particularly useful in Japan where utilities often sell electricity between 7-9 AM at more than twice the price of electricity before 7 A.M.

Grid Power Scheduling

A purpose of many embodiments herein is to optimally harvest energy from renewable sources such as solar and wind, that are limited by solar and wind, and not limited by I immediate financial "demand" such the ability of a consumer to pay for more electricity. Accordingly, the energy input (using solar electric as an example and first ignoring the effects of weather) will vary with time in a day as depicted in the top half FIG. 2 and not by demand load, wherein consumers decide to turn appliances on and the utility must respond with enough power. This figure shows a realistic daily solar energy flux in the absence of weather complications and further information can be found at http://www.newport.com/Introduction-to-Solar-Radiation/411919/1033/content.aspx The Y axis is solar energy received by a solar panel installation and X axis is time throughout the day. Solar energy is about 20% maximum at 7 AM (point A) and at 5 PM (point B). Solar energy is 100% maximum at noon (point C).

The bottom half of this figure shows representative solar irradiation on solar panels from significant weather events.

In an embodiment a local grid pools power from multiple sources at times A and B to provide power to fewer sources (such as one user) for morning and evening appliances such as coffee makers and stoves. This control is achieved a number of ways. In one embodiment, each user (at two or more nodes) decides in advance who will obtain power in a selected time by an auction bidding or other arrangement. In one embodiment, this decision is made by history. A user who uses a group power from 8:00 to 8:15 in the morning may continue to do so until giving us his place, while another user can elect a time slot from 8:15 to 8:30, if that is open.

An auction of user time and/or power amounts can be held repeatedly, such as once a month or could be held in real time. In an embodiment this is done by computer or by smart appliance negotiation, wherein a user will instruct the appliance or computer to get him (for example) hot coffee, toast or another energy consuming service at a desired time. The computer or smart appliance will negotiate with other nodes or a central server to get that energy. In an embodiment, any energy deficiency is made up by importing from another grid or from non-renewable or stored energy. The appliance or computer may as a result inform the user when (and optionally for how much) that service can be obtained. In another embodiment, the cost (in money or other advantage) of the power varies throughout the time period shown in this Figure and the micro grid may utilize back up power or even imported power from another grid to make up any deficiencies of its own power output.

In an embodiment a weather report or solar forecast is used to inform decisions on price and/or availability of power. At time C, near the middle of the day, a different tariff likely would be used. In an embodiment, a user (node) on the system can elect NOT to share power and opt out. In another embodiment, a user may be a prime energy supplier and provide contracts for guaranteed power, which can be an absolute price for an absolute time in advance, or merely be a contract for guaranteed back up power if other consumer cannot obtain his own power with enough reliability.

Significant solar weather events such as a cloud passing by or an extended system of a rain storm is represented in the bottom half of the figure, wherein using the same time axis, the solar input is interrupted by individual clouds (D and E) and by a rainstorm (F). In an embodiment 3 or more nodes report solar radiation at their location and this information is used by the grid to accommodate the weather events and to predict localized activity.

A maximum power point tracking mechanism preferably is used for many solar panel inputs at various nodes. Such mechanism produces a data set of maximum power from a solar panel at intervals over a time period. In an embodiment these data are used to determine solar radiation changes to detect changes in cloud cover. Each known MPPT technique and apparatus known to the skilled artisan can be used in embodiments for tracking solar radiation weather events such as those pictured as "D," "E," and "F" in the figure. See for example the contents of https://en.wikipedia.org/wiki/Maximum_power_point_tracking which is specifically incorporated by reference in this context.

MPPT system have their flaws and inefficiencies, however, including for example, in some cases terminating power collection to get a data point, and in other cases oscillating around an inefficient condition. A method preferred by the inventor is to empirically determine the maximum power point (recorded as an output voltage) for a given panel or use the manufacturer's value for a given temperature (again, "panel" can be plural as used herein) and set that as a target voltage. Changes from this target voltage mostly are due to panel temperature and are compensated by a. repeatedly measuring panel temperature with a sensor such as a thermistor that preferably contacts a solar cell of the panel from behind, (or indirectly inferring temperature from time of day/year or a received communication) and b. adjusting the maximum power output voltage for temperature by adjusting loading. Typically a panel Vmax will decrease by about 0.12 volts for a one degree C. increase, for polycrystalline materials.

In another embodiment, instead of relying on MPPT data, a light sensor such as a cadmium cell facing the sky overhead is used to measure solar radiation. A series of solar radiation measurements (either from MPPT or direct measurements) are taken and used at 3 or more nodes to determine a cloud movement event and more severe changes. In an embodiment, multiple data points in time, such as at least 5 points periodically spaced, at least 10 points or more are used to determine the edge of a cloud movement as shown immediately to the right of arrows D, E and F in the figure. The degree of radiation change and the rapidity are recorded at two or more nodes and compared, with time stamps or indirect time tagging of the changes.

The changes are compared and similarities examine between nodes. For example at 7:30 AM in the figure bottom, a cloud passes by one node as shown in this figure. The received radiation slowly drops over a 35-40 minute period by more than half but then recovers. This pattern of degree and direction and time of change, is compared with that of another node and used to predict energy harvested on further away nodes located on the vector that goes from the first recording node and second recording node. The pattern starting at E shows a short quick drop, a short leveling off and then a sharp drop at 10:30 AM. This pattern is compared with outputs of other nodes similarly. The comparisons preferably are done at each node from information passed to the node from other nodes. One or more administrator or supervisors nodes can do a comparison or receive a comparison and respond by turning on a power backup system, importing more energy from another grid, or obtaining more energy from a trunk line, from a grid or power source far away. By comparing the changes and finding similarity between changes at one node and a second node, and knowing which node recorded first (and the time lag between the detections at the nodes) the administrator grid can determine and predict when which nodes will experience decreased energy output and about how much. Furthermore individual nodes can switch priority loads based on a predetermined plan to accommodate the changes. For example, a thunderstorm starting at F can be sensed by an unusual degree of darkening per unit time (above a set threshold) which can also be triggered by a minimum threshold of nodes reporting a severe drop in radiation above a threshold. This information can be used to turn off air conditioning specifically if it is predetermined that air conditioning is not needed during rain storms. Furthermore, other actions can be taken such as turning off water sprinklers and modifying a sprinkling schedule.

EXAMPLES

Combine Grid Power with Utility Backup Power and with Battery Backup Power

In a practical working example, solar energy power was supplied to a kitchen and utility space as follows: 33 volt maximum power panels were wired in series of 4 each to generate 6 strings of 4 panels each for a total voltage of 130 volts. This was deemed grid target voltage. The series/parallel arrangement of 24 panels was used to power a 50 gallon electric water heater via a circuit that converted the DC to pulsing DC with good results. A PWM circuit was used to pulse power at 100 hertz and this was used to power a coffee maker, a waffle maker and a frying pan directly from the 130 volt solar panel group. It is important that in addition to a blocking schottky diode, only one transistor junction was interposed between the solar panel group and the appliance. This is much more efficient compared to A.C. power grids that convert DC to A.C. (and frequently back to DC again). In another embodiment no more than two transistor junctions are interposed between the solar panel and equipment.

The 130 volt power (without intervening circuitry) was fed to receptacles. Computers and cell phones were powered directly by plugging in their adapters. For backup power to these high priority devices, a 1500 watt isolation transformer was used with utility power on the primary. The secondary was rectified with a bridge rectifier and coupled in parallel with the solar panel (130 volt nominal) power. A blocking diode was wired in series with the solar panel power to prevent power from flowing backward from the transformer. During use, when solar power was insufficient the DC voltage dropped below 130 v and as the voltage approached 120 volts the utility power (isolated via the transformer) gradually contributed.

When no utility backup power was used, enough solar power was available to drive a stereo just after sunrise. At 8 AM (northern hemisphere October 28) enough energy was available to drive a coffee maker and make 5 cups of coffee. On a late morning during a light rain, enough solar energy was available to make pancakes on an electric griddle during the rain in overcast conditions with only one MOSFET interposed between the solar panel and the appliance. It is believed that a relative absence of complicated and expensive equipment (and using only one transistor junction of circuitry between the solar panel and the end use appliance) was responsible for the efficiency.

The solar panel system worked by itself to power a 600 watt appliance at 7:30 PM in October 28 in the Northern Hemisphere. The system continued to work to run a stereo until 8 PM. The lack of a battery and battery inverter, DC to A.C. inverter and other equipment made this efficient use of solar energy possible.

In another embodiment, an eight 12-volt lead acid battery system was installed and wired in parallel with the 130 volt solar powered system. During normal use the battery system was about 107 volts DC and took up supply of power during cloudy overcast moments and at night. The only equipment needed for this was a blocking diode to keep battery power off of the solar panel.

Smart Receptacle for DC Power in the Home

Many modern devices (cell phones/computers) can plug into the DC grid directly if the voltage is not too high (typically less than 240 volts). And, resistance heaters work fine if the DC current is chopped (typically 3% off time for 50-100 Hertz). In an embodiment, a power interrupter circuit is provided that supplies appliances such as coffee makers, toasters, griddles, and hot water heaters, from direct current by interrupting the direct current power to the appliance by at least 10 hertz frequency, preferably between 25 to 1000 hertz and more preferably between 50 to 200 hertz. However, to prevent accidental use of an A.C. motor or old fashioned wall wart (transformer based power supply) the following smart receptacle is provided.

Figure 3:
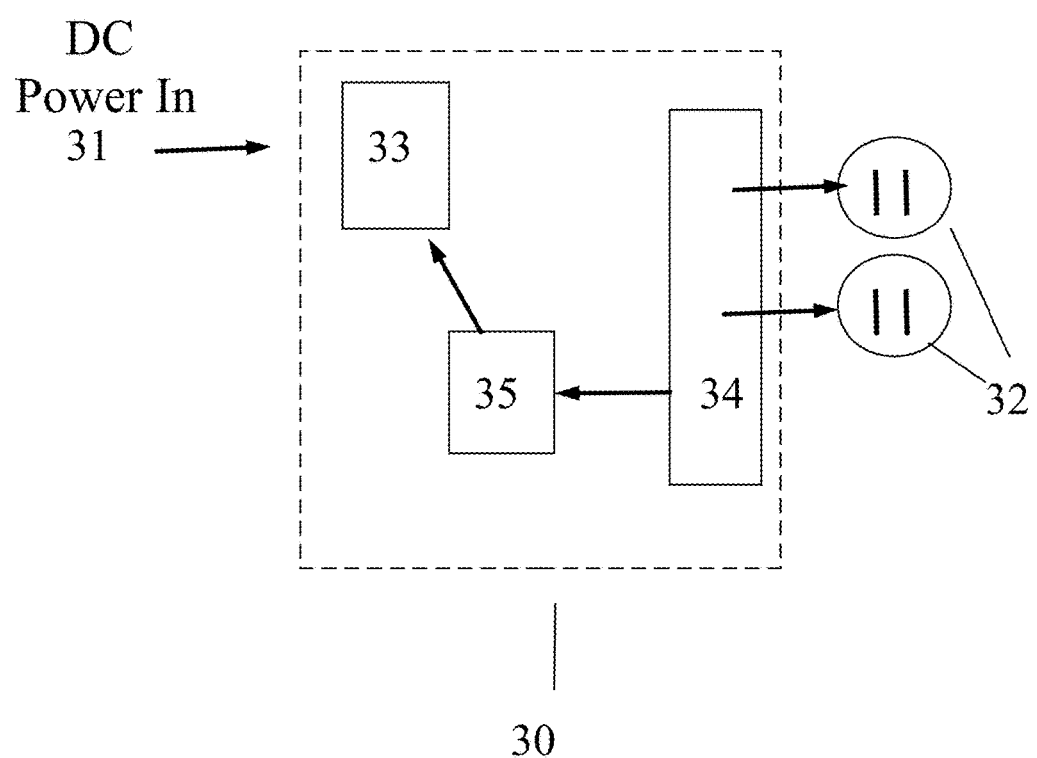
FIG. 3 is a block diagram of a smart outlet that senses an AC power load.

FIG. 3 shows a power outlet circuit interposed between a DC power source (preferably a direct connection to a grid as outlined above) and an appliance. Box 30 is a circuit that connects to input DC power 31 and outputs to power plugs 32. An electronic valve 33 (preferably a MOSFET, IGBT or other solid state device) controls flow of power between input 31 and output power plugs 32. Sensor circuit 34 detects inductive load and if found, controller 35 turns off valve 33. Each of these separately and/or in combination is a circuit.

The term "circuit" used in this specification means electronic components connected as can be engineered by a hardware electronics engineer with at least 3 courses in circuit design in college and 2 years of experience and may represent a sub-circuit within a larger circuit. Also some or all of the operations of the circuit can be carried out in software by a microprocessor. For example, a microprocessor can detect a connection by software that repeatedly looks at conductivity between two points (the power plug 32). Upon sensing a connected appliance, a subroutine queries the connected device (senses resistance, inductance, and/or capacitance etc.) to determine if the connected device is primarily an inductive load. During this time, an initial probe current preferably is used and not the total voltage (eg 120 volts) that the device may be designed for.

Although a pure circuit made of op amps can determine whether a load is inductive, a software routine more reasonably would be designed by a skilled artisan to detect voltage lagging current (a sensed inductive load) by accepting data from one or more sensors, as a skilled artisan would readily appreciate. For example, application of a small voltage or short pulse less than 10 volts and then sensing of a rising voltage or decreasing current by two or more measurements made serially by a sensor(s) after entry of data into a file and their comparison is easily done with a microprocessor. If the plugged in device responds to an impressed voltage by current lagging the voltage over a short observation time (e.g. 0.1 sec, up to 0.5 sec etc.) then the device is inductive and the valve is turned off. Additional sensing techniques are available as is well appreciated by a skilled artisan. Preferably, the device has an alert signal such as a light or audio alarm or both, that also are turned on in response to a decision that the plugged in device is inductive. This is to alert the user that the device is rejected.

In an embodiment the smart receptacle comprises a current sensor that is the same as or similar to that used for GFI receptacles. See for example the ground fault interrupter described in http://hyperphysics.phy-astr.gsu.edu/hbase/electric/gfi3.html#c1. In this case a differential output from a toroid coil is sensed by a differential amplifier to detect a difference in current going out versus coming back from the outlet. A more detailed device is shown in https://www.fairchildsemi.co.jp/datasheets/FA/FAN4146.pdf. Preferably in this embodiment a GFI sense transformer as described here is used with the DC power wires (plus and minus) going through the toroid center or looping around the sense transformer in a similar manner as that used for AC ground fault detection. The toroidal transformer has a secondary of many windings that connect to the comparator. The output may be monitored for a current lag from negative power side (electrons flowing out to the plugged in load immediately after connection and turn on) to the positive side. That is, more current goes through the negative line than through the positive line for a short period of time after commencement of current flow. Detection of this change triggers an alert that the connected load is inductive and activates a trip mechanism to stop current flow. In an embodiment the current imbalance is monitored for a period of time determined by the maximum current flow through the negative power lead, such as 10 mA, 50 mA, 100 mA or even up to 1 amp. In another embodiment the current imbalance is monitored for a positive slope (increasing current with time) for a set time after sensing or responding to a connection. A set time may be for example 10 milliseconds or 100 milliseconds, between 5 and 25 milliseconds etc. Preferably the set time commences at least 1 microsecond after a load is added, and preferably at least 10 microseconds and more preferably at least 100 microseconds after a load is added by plugging in.

48 Volt Micro Grid: a Sweet Spot for Low Power Grid

A low power version of a microgrid preferably is 48 volts. This is a stated nominal voltage. More typically a target grid voltage of about 52 or 53 or up to 56 volts (a maximum voltage some have deemed safe for land-telephone lines) may be preferred because a charged lead acid battery is about 13 volts and 48 volt solar electric systems, with attendant available equipment are widely used. Voltages of up to about 50 volts are considered safe in many situations from the viewpoint of avoiding electrocution of a person who may touch both plus and minus power wires. Both safety and legal requirements are very different at this voltage.

Figure 4:
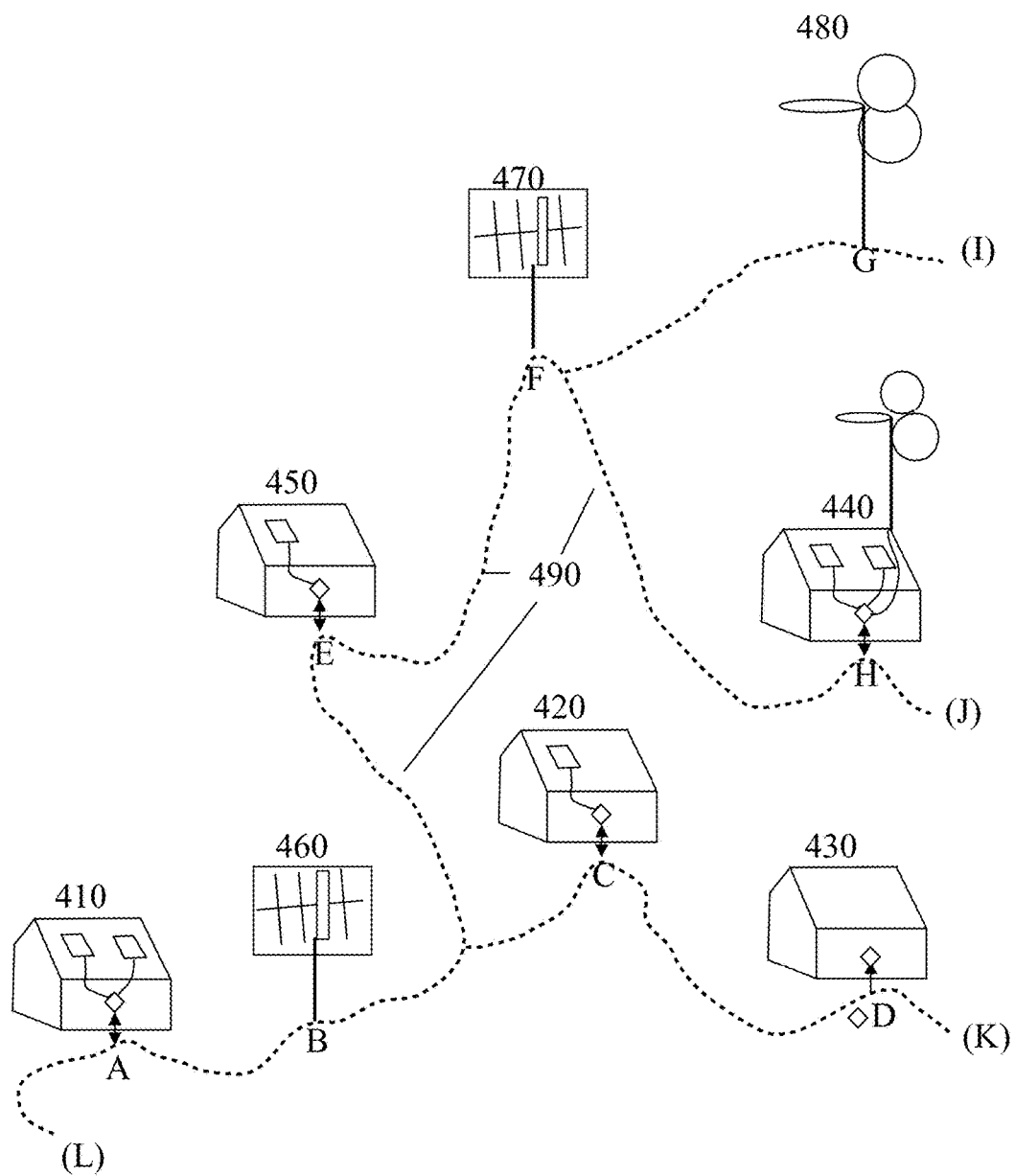
FIG. 4 is a diagram of a neighborhood grid.

FIG. 4 exemplifies a small 48 volt microgrid that is preferred for city use, and shows buildings (or apartments) 410, 420, 430, 440, and 450; isolated solar panel installations 460 and 470; and isolated wind power installation 480 connected together by dotted power line 490. These load and source location nodes are labeled A-H and connected by a two wire grid dotted line 490 with the two wires 50 volts direct current voltage separation between them. Additional nodes I-L are not shown. Lightning arresters, pulse-suppressors and static discharge devices are not shown but preferably are connected at each node.

All locations except 430 can supply excess power to the grid via a connector (seen as a diamond shape within the building symbols) that connects solar and other sources of power to the approximately 50 volt DC power grid 390. Current can flow in both directions between each node. For example, power can flow in power line 490 segment from A to B, if location 410 has excess power, which can be delivered, for example, to house 430 and/or another location. Power can flow instead from B to A if A presents a net load to the system. Preferably in an embodiment, the net flow within each segment shown here is determined automatically by voltages at the nodes, which are in turn established by increasing load at a node (and thereby decreasing voltage) or decreasing load (increasing node voltage) or even supplying power at the node, (to increase node voltage), in accordance with a set of rules as described above. In an embodiment, this regulation is hardware-circuit based and not susceptible to hacking from the outside.

Grid Segment Current Regulation

In an embodiment, each segment (wire between nodes) has a current governor, which prevents direct current overload of the wires of the protected grid segment. Preferably, the current in the segment between two nodes is sensed and limited as the current approaches a set maximum for that segment based on the wire characteristics. Preferably, the current is monitored by a current sensor such as a hall effect sensor or even a simple small series resistance that generates a current signal voltage.

Figure 5:
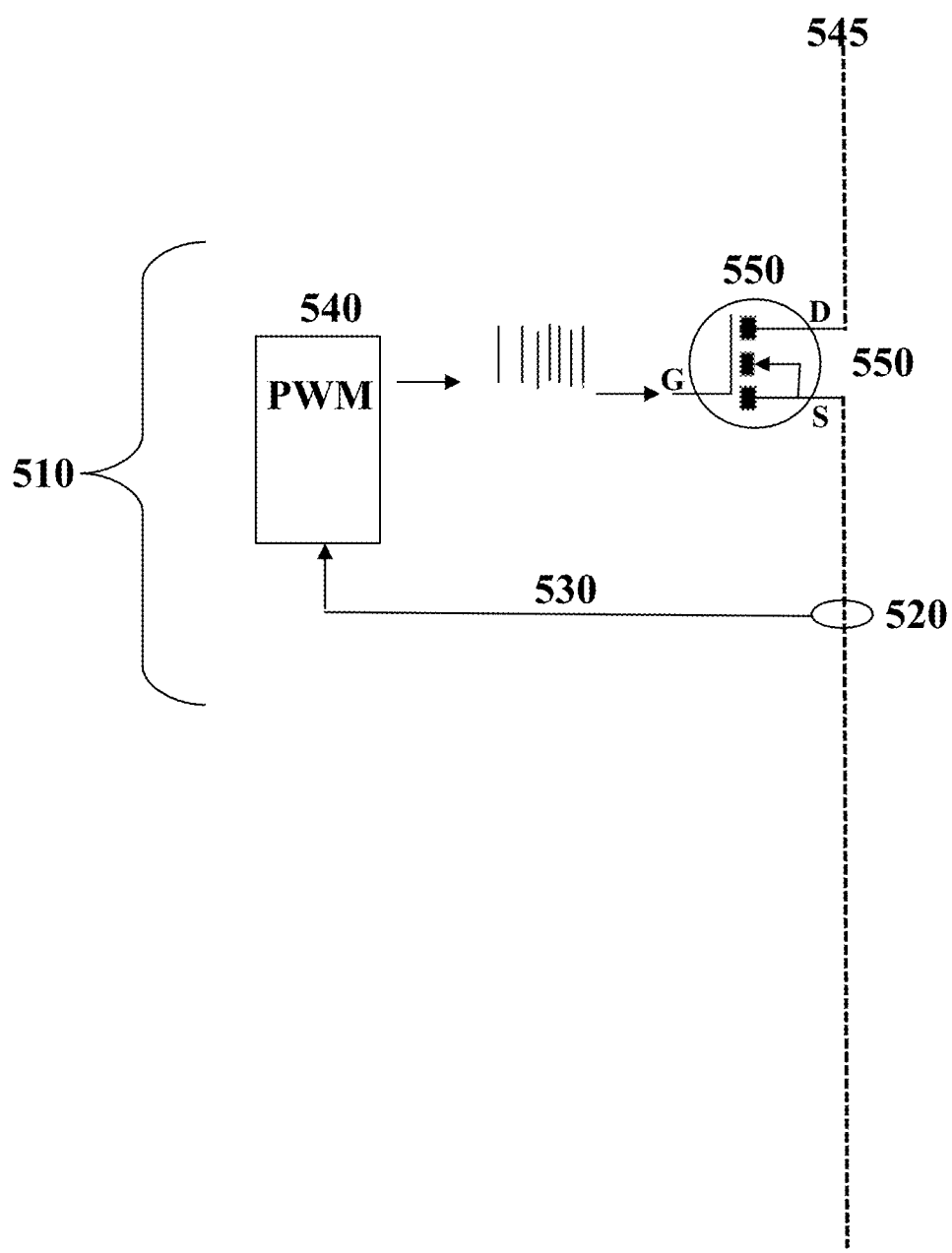
FIG. 5 is a basic diagram of a PWM controlled power.

FIG. 5 shows such an embodiment wherein a phase width modulator circuit 540 limits current flowing in one wire 545 of a circuit pair. The current is sensed by current sensor 520, which outputs signal 530. Signal 530 is input into controller 540, which can be a circuit and/or computer processor that compares the signal with a reference and activates a shorter duty cycle time of a phase width modulated switch 550 (a MOSFET in this case) that can interrupt current flowing in that wire to thereby limit current as necessary to avoid overload. In an embodiment at least one modulator circuit is interposed in each line of the segment. In an embodiment, a power connection at a node is at a side that is not controlled by the circuit and the power to and from that connection does not flow through the controlled segment (two different segments being connected to the node). In another embodiment (not shown here) the power connection is switched between the controlled grid segment and an uncontrolled segment.

In an embodiment, a three wire double circuit is used, wherein one line is common to both circuits. Preferably the third, common line has a current carrying capacity that is about the sum of the other two lines.

In an embodiment, this circuit or connection senses current in both directions and determines whether the current is equal on both lines. If not equal, then a serious problem exists and the segment might be shut down or an alarm issued. This problem is more common with a grounded system wherein one of the two wires of the circuit is grounded and a ground fault occurs somewhere.

Circuit 510 protects the grid segment from overload in a continuous manner. The advantage of this overload control versus a regular (i.e. utility A.C. grid on/off only) circuit breaker is that smooth control is had wherein maximum use is obtained without any sudden interruption of using the grid power line. In an embodiment, when a current overload condition approaches and/or is responded to, circuit 510 sends an overload signal to other nodes to alert them to the presence of limitation in current flow. The overload signal could be a value that is proportional to the current sensed, and/or could be a signal indicating the extent of decrease in current flow made by the switch 550. The advantage here is the current limitation alert signals from two or more nodes combined indicate both direction and magnitude of excess demand, or excess power. For example, if a given segment is becoming overloaded or near to becoming overloaded (eg. within 90%, 95% or 97% or more current capacity), then a lower priority load can be activated to take up power upstream of the segment and alleviates power applied to that segment.

Other nodes can respond to an overload or incipient overload condition by placing less power onto the grid, and/or by increasing their loads to decrease the amount of flow through that segment. By sensing in a continuous manner, a smooth control can be had wherein for example, low priority loads closer to a power supply can take up power in a smooth manner to avoid overload challenges in nodes located further away.

100-108 Volt Microgrid: Another Sweet Spot for Low Power Grid

The inventor discovered that many available solar panel types can be connected in series to generate nominal Vmax of about (I.e +/−2 volts, and particularly +/−1 volt) 108 volts. This is a sweet spot because such DC power at about 108 volts can be used directly to provide power to laptop computer adapters, printer adapters, monitor adapters, cell phone adapters and the like. This lack of need for voltage boost circuitry significantly increases efficiency, increases reliability and decreases cost. Also, conversion of around 108 DC to pulsing DC is much simpler and allows such panels to drive kitchen equipment such as coffee makers, grills and the like, preferably only using one controller (eg. MOSFET) and an optional diode, between the solar panels and the end use device. Accordingly, 100 to 108 volt nominal grid voltage systems with solar panels connected in series to a series Vmax of about 108 volts is extremely useful for many embodiments. Direct connections to many (computer, cell phone, LED lighting) power supplies and pulsing DC connections to water heaters and other heaters is preferred for such systems. Examples of use are provided below, including FIG. 7 through FIG. 12.

High Efficiency Solar Booster Circuit for Low Light Harvesting Conditions

One problem with existing solar electric equipment is that their circuits generally are designed for high sunlight solar power. Generally, much less efficiency is had at low light levels. Much equipment herein described for using solar energy in a microgrid converts solar energy into a proper voltage and impedance to feed a power line. Most individual solar panels have maximum produced power point at a lower voltage than the grid voltage. For example, solar panels with 18 volt outputs need to be boosted to about 50 volts for a 50 volt microgrid. Further, it is preferable to boost individual panels and not groups of panels in series (for high voltage) to avoid the problem of one cell in a panel being shaded or broken, affecting the whole string. A boost controller typically is used for this purpose.

However, generally available boost controllers are designed for an optimum current and voltage. Such design takes into account the inductor saturation current and minimum current among other variables. In particular, the inductance and frequency need to be very high for very low currents, but low for very high currents. As a result, the equipment, which uses a constant frequency, is optimized for efficiency at high power levels but does not have good efficiency at very low light levels. This problem generally is unrecognized in this field. Advertisements and specifications of equipment ignore low power levels and generally low light level power is ignored as unharvestable or uneconomic.

In an embodiment, a solar electric boost converter is provided that adjusts for low light level efficiency automatically by increasing pulse frequency at low current output levels. The frequency most often is set by an RC circuit wherein a resistance and capacitance are chosen to establish the frequency. In another embodiment however, the frequency is set by a microprocessor output, which in turn may have an RC controlled clock, or more likely a crystal controlled clock. In an embodiment, the frequency is adjusted by a voltage controlled oscillator that responds to sensed solar panel output current, or light level by increasing frequency at lower current levels and/or lower light levels respectively.

For this high efficiency up-conversion device, the current output from the solar electric power is sensed. A wide variety of sensors are known, such as hall effect sensors, series resistance—voltage sensors, and the like. Light itself could be sensed to indirectly determine solar electric output current. The sensed output is used to decrease pulse frequency in a boost converter circuit with increasing solar electric output. By increasing frequency with decreasing current from a solar electric panel, the boost circuit can avoid a lock up condition wherein the inductor loses stored energy between pulses, and thereby allow more efficient use of energy at low light levels.

In an embodiment the frequency at least doubles in response to a decreased light level or solar panel current to less than 30% of maximum. In an embodiment the frequency at least triples in response to a decreased light level or solar panel output current of less than 20% of maximum. In an embodiment the frequency increases linearly in response to decreased light level or solar panel output current over at least a two fold range.

A Representative Upconverter to Apply Solar Energy to a Grid Node

Figure 6:
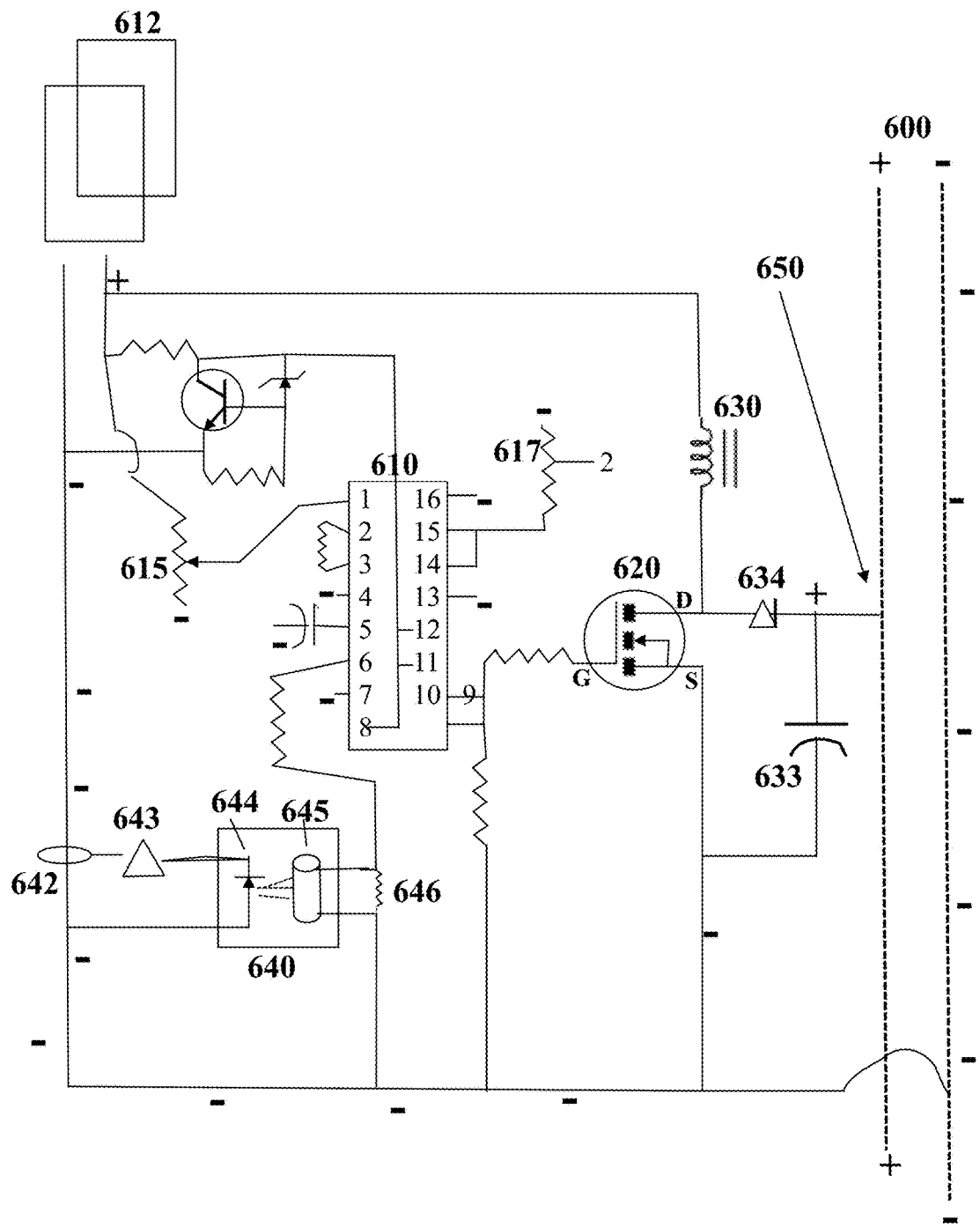
FIG. 6 is an outline of a solar panel to grid upload box that has 3 feedback systems.

FIG. 6 is a representative circuit diagram of an apparatus that boosts the voltage of a solar panel 612 connected to grid 600 to boost the panel voltage up to grid voltage with high efficiency frequency control for low light levels. Preferably, the circuit maximizes power output from the solar panel by modulating duty cycle to the grid based on the solar panel output voltage, in a manner to increase solar panel loading until the solar panel output drops to a Vmax or near Vmax condition. Vmax can be determined by an MPPT controller having a microprocessor following an algorithm as is known in the art, or set and used by a simple circuit as shown in FIG. 6.

In FIG. 6 a pulse modulator 610 in a boost configuration (with inductor 630 and capacitor 633 separated by diode 634) drives MOSFET 620. This uses feed forward control wherein solar panel feed voltage (the input voltage from solar panel 612) is sampled at 615 and compared with reference 617 to control duty cycle. By this configuration, a more optimum solar power is obtained from the solar panel. Inductor 630 is sized and RC time constant circuit at pins 5 and 6 (which can be replaced with a microprocessor controlled output frequency) is optimized to generate an output voltage that is at least as high, preferably higher than a grid threshold voltage. This allows maximum solar energy extraction from the solar panel, wherein at high solar output, the grid voltage at connected node 650 may be slightly higher than the average grid voltage.

In a preferred embodiment, which provides higher efficiency at unusually low solar energy power, the frequency of the PWM is increased as the supplied solar electric power (preferably measured as current) from the panel is decreased. In an embodiment, current is sensed continuously by sensor 642 and the sensed signal, buffered by inverting buffer 643, drives optocoupler 640, which comprises LED 644 coupled to cadmium sulfide light sensitive resistor 645. This resistance impressed onto parallel coupled resistance 646 increases as current from inverting buffer 643 decreases. The increased resistance of the (in this example) resistance from 645 and 646 provides lower frequency for high power. Conversely, lower resistance provides higher frequency for lower power. This alleviates the lock up problem of voltage boost circuitry wherein the inductor lacks stored magnetic field at the beginning of each phase, and locks up. This embodiment allows efficient electricity harvesting even at low light levels such as 10% of maximum, 5% of maximum, 3% of maximum, and even 2% of maximum (defined by the manufacturer of the solar panel). In this hardware embodiment, RC circuit 640 includes LED 644 that activates cadmium sulfide light resistor 645, which in turn modulates resistance in the frequency setting circuit presented at pins 5 and 6 of PWM controller 610 in response to light.

LED 644 and light resistor 645 in this embodiment are part of a vactrol, (Silonex optocoupler NSL-32SR2) which is preferred and preferably adjusts frequency from about 15 kHz to about 150 kHz. An TL494 PWM chip outputs a PWM pulse at a frequency determined from this RC circuit but in another embodiment, the PWM pulse, and control of frequency is determined by a microprocessor, which responds to a current sensor signal input to increase frequency with decreasing sensed current.

This circuit was built with good results. Some minor filtering was needed between coil 630 and the power input to the control circuitry to prevent spurious noise interference and the control by the current output smoothly changed frequency. In an embodiment more or even most of this circuitry can be made in a single integrated circuit. In a preferred embodiment the control circuitry is a microprocessor running a stored program and using A to D inputs of the microprocessor to measure voltages and using outputs to control duty cycle and optionally, frequency of pulses sent to a power device such as a MOSFET or IGBT. In an embodiment, frequency control is achieved by a microprocessor or other hardware changing or re-setting the frequency. For example, a microprocessor can itself create a square wave output or control another chip by outputting parallel bits or a serial bit command to a dedicated frequency generator chip such as a loop lock counter.

In an embodiment not shown here, the PWM frequency is made by a voltage controller oscillator and is adjusted in response to solar panel output. Preferably the current is measured by a series resistor or hall effect device and a sensed voltage is amplified and compared with a reference. A low current condition uses a higher PWM frequency and higher current condition uses a lower PWM frequency. Preferably a continuous decrease in solar panel output current causes a continuous increase in frequency over a least a two form range, a 3 fold range and more particularly over at least a 5 fold range. This allows improved low light power efficiency use.

Use of the Grid Power

Preferably, the grid voltage is at a level that allows direct use of buck boost, and buck adapters such as commonly used for computers and cell phones, and recent advanced higher efficiency monitors. For use, the computer or cell phone adapter is simply plugged into a power outlet attached to the grid.

Many electrical tools that can work on DC power can be directly coupled. Also, many lighting systems can be wired to use the grid voltage without voltage conversions. For example, the inventor wired a building with 48 volt DC wires. Conventional wall switches were used to switch lights without voltage conversion by wiring 24 volt LED lights (two at a time) in series, and 12 volt LED lights (4 at a time) in series, directly to the 48 volt house grid.

Representative Down-Converters to Remove Power from a Grid Mode

Lower DC voltage devices can be easily powered from a higher voltage grid by buck conversion via a buck circuit as is known in the art. In this embodiment, a PWM circuit driven buck converter is used to make a lower voltage by a combination of inductance and semiconductor switch such as an IGBT or MOSFET. Preferably the output voltage is sampled and controls duty cycle of the PWM generator. Preferably the PWM generator is a dedicated chip such as LT494 or a microprocessor that accepts sensed load voltage signal and controls duty cycle of output signal that controls the gate of the semiconductor switch.

DC Switching to High Power Appliances

High power devices, typically above 100 watts, particularly above 200 watts and especially above 500 watts generally require a pulsing DC power to prevent welding of the control switch and/or internal thermostat. Higher power devices such as water heaters, coffee makers and electric grills were powered from a DC house grid by pulsing the DC to avoid melting the switch contacts. Preferably, a long duty cycle of at least 90% and more preferably more than 95% is used with a frequency of more than 10 hertz but less than 10,000 hertz.

In an embodiment, a DC switcher circuit includes a PWM controller that provides a switch square wave pulse between 25 and 1000 Hz. Preferably the controller includes a feedback circuit that responds to a decrease in supply voltage by decreasing duty cycle. For example, when attached to a grid node with a target voltage of 105 volts, if the node voltage goes below 105 volts (or other set value such as 103, 102, or 100 volts) the DC switcher circuit decreases duty cycle to compensate. The popular TL494 PWM chip can easily implement this with one of its error amplifiers using sampled input voltage compared with the 5 volt reference.

Grid Building Kits for Individuals and Small Businesses

A self-regulating grid as described herein provides liberty and efficient energy for small users that may not want to become subservient to a large bank, government controlled entity or banker controlled entity. This is particularly valuable as government fiat currency loses value and such large entities need to extract increasing rent from progressively impoverished wealth producers. In particular, a low voltage grid is provided that allows a user to buy and install his own power generation and install his own grid node, using a simple kit with instructions.

In one embodiment a kit of at least two devices is sold and used to allow a new user to join a microgrid. One device is an "upverter" that uploads solar power (preferably), wind power or other power to a grid at a node connection. Preferably the upverter comprises a plus and a minus terminal connection for attaching a varying power source such as a solar panel. The upverter also has a plus and a minus terminal to connect to a microgrid as described herein. The two minus terminals or the two plus terminals can be a common terminal.

A second device is a "downverter," which loads to a connected grid. The downverter has plus and minus terminals for connecting to the node, and has two connectors for connecting to a load. In an embodiment, the downverter has a power plug for plugging in a computer or cell phone. In an embodiment, that power plug is a smart plug as described herein. In an embodiment, the downverter has a special plug for plugging in a high power (over 300 watt) device such as a hot water maker or kitchen heating appliance such as a grill. In this embodiment, the downverter supplies pulsed DC power to avoid melting of a switch associated with the appliance.

Another device may be a power storage coupler, which connects a storage battery, or other energy storage device to the grid. This preferably is a container or box and in an embodiment may contain a lithium or other type of chargeable battery. This device preferably has an outlet for DC and or AC equipment to plug in. Preferably the device has one or more signaling devices such as light emitting diodes that inform the user of the availability of stored power (proportion filled), state of charging vs discharge, and the like. In an embodiment this device takes energy from the grid when low priority is available, as detected by at least a higher node voltage or received communication signal. In an embodiment, this device obtains energy to store locally, from same node or separate wire connected input into the device from a locally connected solar panel, wind generator or the like. In an embodiment this device only supplies backup power at its location (again, preferably via hard wire connection or plug in connection to the device itself. In another embodiment, the power storage coupler feeds backup power into the grid via attached node. This might occur in response to an emergency signal or other signal.

In an embodiment, the upverter and downverter are provided as a single unit. Ideally, a microprocessor senses connected load voltage and makes decisions on how to activate the load based on sensed load voltage. In a related embodiment, individual solar panel devices and/or groups of solar panel devices are separately connected to the node by their own upverter box. This latter embodiment allows a user to increase power capacity by merely buying more panels (or wind generators) and simply adding an additional upverter box to the node each time to connect the extra electricity generators.

A Particularly Efficient Sweet Spot for Direct Grid Power Use

Most preferred is a target DC grid voltage of about 105 volts (for Japan) or about 125 volts (for the U.S.). This allows download power to computer, cell phone, printer, and other devices that can employ DC without using energy-loss conversion via a buck converter, DC to AC converter or other converter. Furthermore, the grid voltage also can be used directly by high power appliances such as water heaters, coffee makers, some ovens, grills and fry pans after simple conversion to pulsing DC to avoid damage to switches and thermostats.

Figure 7:
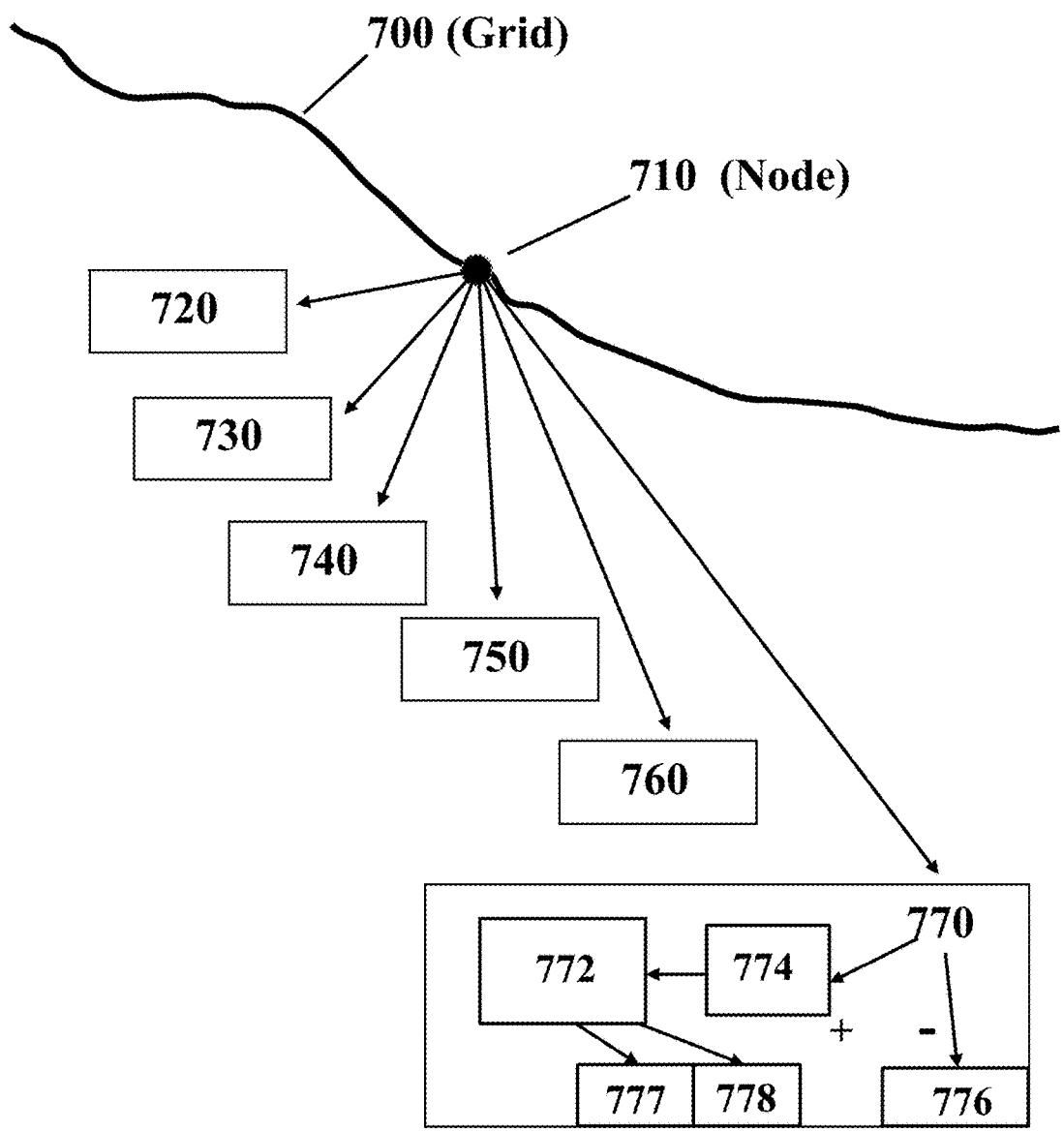
FIG. 7 is an outline of a node having various connected download boxes.

FIG. 7 summarizes some embodiments for download from a DC grid having a voltage similar to that used directly by loads. Grid 700 has a target voltage of 105 volts DC and is connected at node 710 to an upload box 720 connected to solar panel via a boost converter. In another embodiment not shown here, solar panels are connected in series to achieve a Vmax voltage equal to or slightly (preferably less than 10 volts) above the grid voltage. Node 710 also supplies DC to a computer power adapter, a printer power adapter, a cell phone power adapter and a stereo radio power adapter directly via down-converter box 730. Box 730 is mere a connection box and lacks any buck or boost conversion circuitry and has virtually no loss. In an embodiment box 730 includes a grid voltage monitor circuit and cuts or decreases power to plugged in appliances upon sensing grid voltage dropping to below a threshold that is below the target voltage. For example, box 730 would cut or decrease power to plugged in appliances if grid 700 voltage at node 710 drops to about 100 volts (using Japanese embodiment) or from about 120 to about 110 volts (using U.S. embodiment).

Node 710 also has box 740 electrically attached, which comprises a DC switcher circuit as described above, to which an appliance such as an electric stove or iron can be plugged in to receive pulsed DC. Preferably a circuit in box 740 decreases duty cycle of DC pulses to an attached appliance when grid voltage goes below a voltage, which may for example be the set node voltage, or another voltage above or below that value.

Node 710 also has box 750 attached, which converts grid voltage to one or more low voltages of 5 volts and 12 volts, via a buck converter and/or a flyback transformer.

Node 710 also has box 760 attached, which converts grid voltage to about 100-120 volts AC power suitable for powering a refrigerator or other motorized device. Because a compressor motor or other motor requires a high start up pulse, a sizable starting capacitor is desired. At least 0.1 farad, more preferably at least 1 farad starting capacitor is desirably included.

Node 710 also has box 770 attached, which comprises a battery 772, a battery charging circuit 774 and output 776 to a lighting circuit. Preferably there is no voltage conversion between the battery and output 776. In an embodiment the battery is two 12-volt lead acid batteries in series and the lighting circuit includes one or more commercially available light emitting diode lights of about 24 volts input power. Preferably the battery is charged only during high lighting conditions (high node voltage, high local solar power supply power, and the like). Because so little power is needed for lighting LEDs, for a small installation the battery does not have to be big (preferably less than 1000 watt hours, more preferably less than 250 watt hours) and can be charged only when excess power is available. Preferably, a higher threshold node voltage is set within a circuit of box 770 and/or sensing of upload power to node, or sunlight level, is used to control battery charge timing. Box 770 with a small battery is preferred with a small battery for a grid made from old telephone wiring cable.

In an embodiment box 770 further comprises other DC outputs 777 and 778 which can be for example USB 5 volt output and 12 volt output and can be converted from battery power and optionally from grid power without battery. In an embodiment solar panel is connected to this battery via a controller and an input for such may be included in this box.

One or more of boxes 730 to 770 may be supplied to a user individually or in combination as part of larger boxes. In an embodiment, a kit of one or more upload boxes 720 and one or more download boxes 730-770 may be offered or sold to a user. Internode wire may be supplied as part of the kit or can be purchased from a home center.

Replace and/or Supplant Utility-Derived Power with Local Grid Power

An embodiment provides power resiliency in increments. That is, a local grid can be used for progressive energy dependence. In an embodiment, local produced energy is used to supplant and augment power purchased from a utility as described in embodiments shown below.

Preferably a PPT solar load controller has a forward feedback system that loads solar panels to near their Vmax voltage.

Using Local Grid or Independent Power to Supplement/Replace Utility Power

Figure 8:
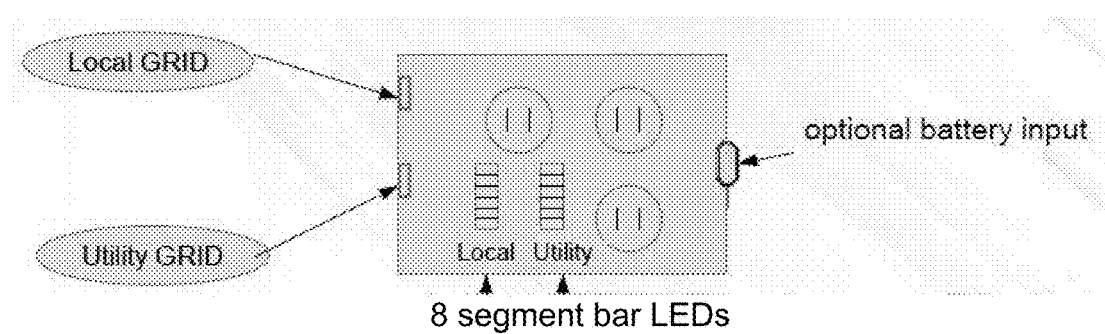
FIG. 8 shows a download box for high priority DC power.

FIG. 8 shows a download box that is inexpensive and that provides supplement of power from utility as well as backup during power outages. This provides easily battery backup that can charge from the grid. Although not shown, preferably the utility power is not directly connected to but an isolation transformer is used. Two bar LED displays show how much local grid contributes versus utility-derived power. The outlets shown in this figure power high priority DC load appliances such as laptop computers and cell phone chargers. This uses the utility grid as backup. When the local grid has insufficient power, both local and utility grid contribute to the power consumed by the load. Preferably, two segmented LED displays (preferably 8 segments each) are used to show the relative amounts of local grid vs utility power consumed at a given time. Also preferably, LED pilot lights are used to indicate the existence of local grid and utility grid power.

Figure 9:
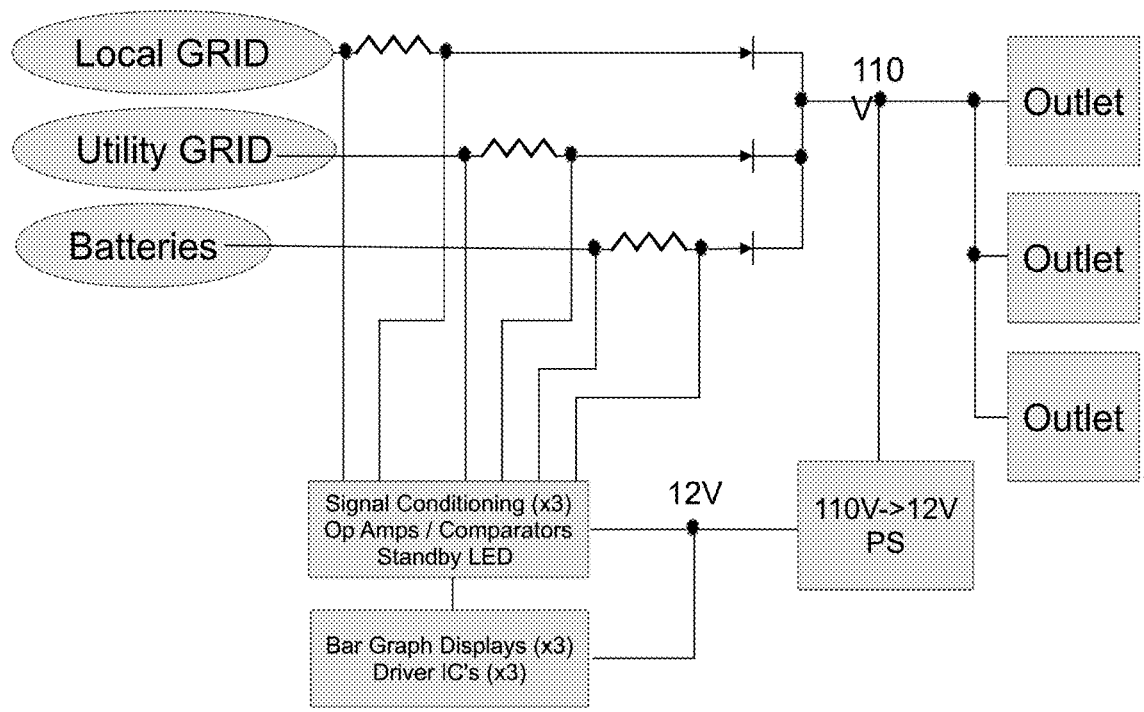
FIG. 9 shows a circuit strategy for implementing the download box of FIG. 8.

FIG. 9 shows a representative implementation of the circuit of FIG. 8. Preferably the power used from the local and utility grids are monitored by a series resister in each line as shown. Preferably this resistor is 0.01 ohms, or between 0.001 ohms and 0.05 ohms. The voltage dropped across each series resistor sensor is amplified and compared with a reference to drive a power signal output such as a an LED display. In an embodiment made, a separate 12 volt power supply was used to generate power for this and other circuits. The outlets provide power to transformer-less devices such as a computer adapter, printer adapter, cell phone charger and the like.

Figure 10:
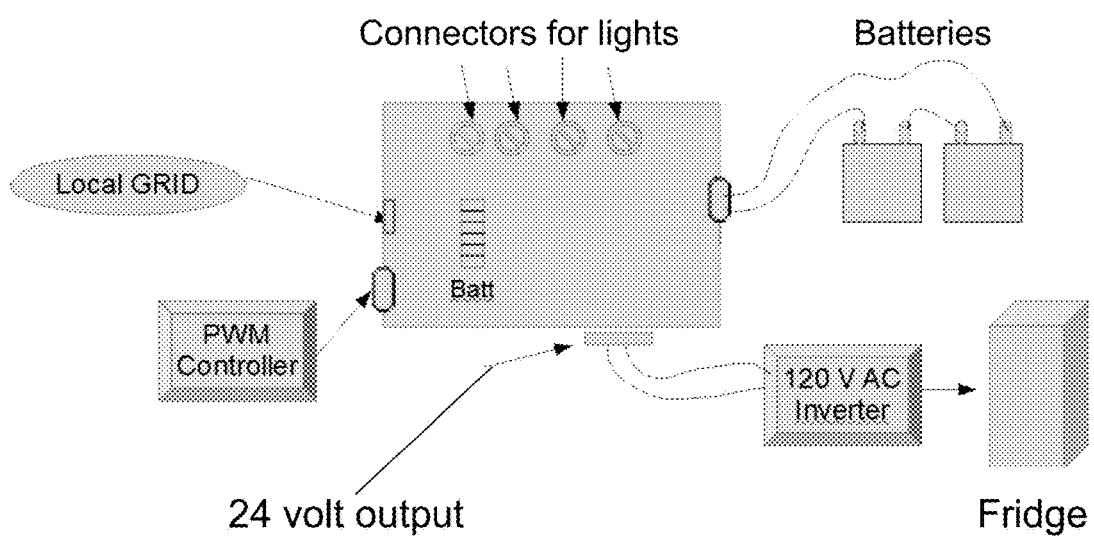
FIG. 10 shows a download box for backup power.

FIG. 10 shows a download box that connects to a local grid (left side shown) and provides high quality power for high quality DC power for routine and for utility grid-down conditions. Preferably this is a 24 (shown) or 48 volt system.

LED lights were obtained from Lowes that were powered by a 120 volt AC to 22-28 volt DC inverter. The inverters were removed and thrown away, and the LED portion of the recessed light was used by connecting directly as shown. For the 24 volt version shown two 12 volt lead acid batteries are connected to provide night time lighting power and backup power. A PWM controller is used to charge the batteries and provide 24 volt power from the local grid.

Preferably the box contains a 108 volt buck converter to feed the PWM controller. A PWM controller could be inside the box but commercial controllers are inexpensive and can be located outboard as shown. In the latter case, since most such charge controllers have an approximate 35 or 45 volt maximum input, it was necessary to create a buck converter to change local grid voltage down to a usable lower voltage level. Also shown is an outboard 24 volt DC to 120 volt AC inverter for powering a refrigerator or other device for emergency and other situations. The download box of FIG. 10 can provide routine night time lighting for off grid lights and provide backup power for and should at least include a battery status monitor.

Figure 11:
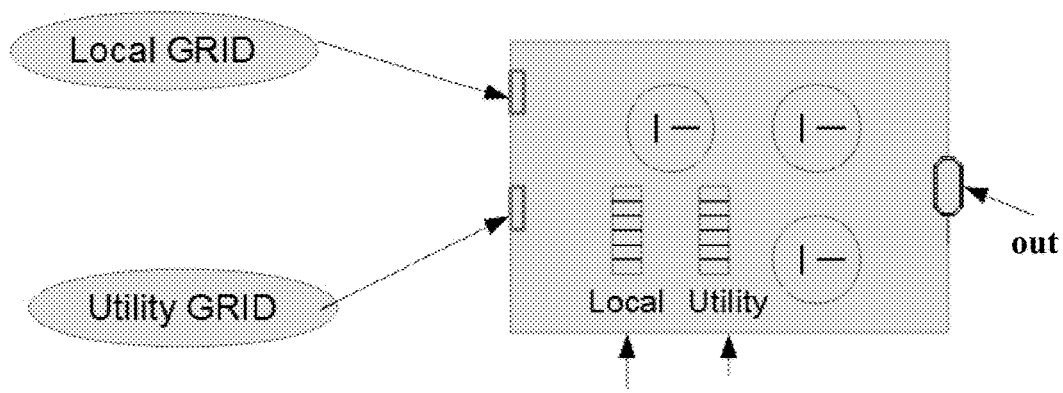
FIG. 11 shows a download box for high power appliances.

FIG. 11 shows a download box that provides high current DC power for hot water heater, electric heater and kitchen appliances such as coffee pot and electric grill. This provides some resilience during use by using primarily local grid power and adds utility grid power as needed. Preferably the utility grid power is isolated and at a voltage that is less than the local grid target voltage. The local grid target voltage ideally is a little less (ex. 2-10 volts less) than the established standard Vmax of the series connected solar panels used to power a nearby node (or same node) on the local grid. This is because the Vmax of connected solar panels will drift down with increasing panel temperature. Depending on geography and local conditions, a skilled artisan will set a target value lower appropriately. For the American market it is most efficient to use a 120 to 100 volt transformer (made and sold for adapting to Japanese electricity) to supply the utility grid input power because of the low cost and ready availability of these isolation transformers. A preferred isolation transformer is not shown here but a suitable voltage was used successfully in a practical working example in Japan to match 120 volts DC from a utility grid (100 volts AC) to a solar panel Vmax 130 volt local grid. As in FIG. 8, a display preferably is used to show relative use of power but a backup battery input is not recommended. Instead, such appliances should be used during sunshine hours.

108 Vmax Solar Power Input Systems: Preferably an upload box connects to solar panels arranged in series/parallel as suited to generate 108 volts Vmax. If was found that many commercial panels have a 27 volt (plus or minus 1) Vmax or 36 volt (plus or minus 1) Vmax and could be connected 4 or 3 in series, respectively to get 108 volts. In an embodiment these 108 Vmax panel groups may be connected directly to the local grid (preferably with a blocking diode) and used without any further energy wasting circuitry. The low and high priority equipment connected to the local grid are set with suitable trigger voltages to add load as needed to load up these directly connected solar panels to keep them near the 108 volt sweet spot, and preferably between 100 and 105 volts.

In an embodiment the connected solar panels have higher Vmax voltage such as 130 volt, 150 volt or more and an upload box uses PPT or MPPT to generate a local grid voltage such as about 100-108 volts. This embodiment typically uses a PPT to adjust pulse duty cycle to load panels to their Vmax condition. The PPT circuit preferably senses solar panel input voltage and senses connected local grid voltage and loads the solar panels to or near (eg. within 10 preferably within 5 volts, preferably within 2 volts) their Vmax (which may be compensated by temperature).

Figure 12:
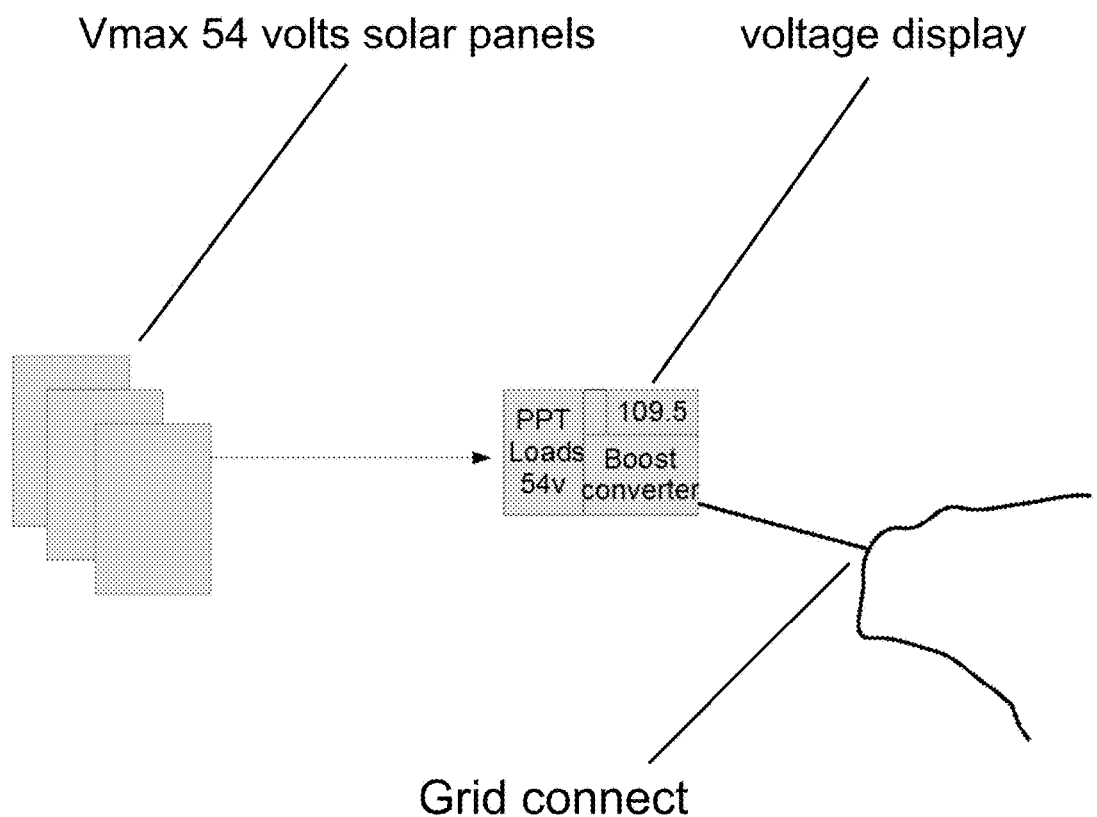
FIG. 12 shows an upload box.

In an embodiment the connected solar panels have a lower Vmax voltage such as 54 volts or 36 volts or 72 volts and an upload box employs a boost converter to generate a local grid voltage such as about 100-108 volts. FIG. 12 shows an example wherein a 54 volt Vmax output panel array is connected to a box that has a boost converter that loads the panels to a suitable voltage such as 54 volts (preferably temperature compensated to a possibly lower voltage). The boost converter is set to output a local grid voltage in this example of 109.5 by monitoring the local node connection voltage and adjusting duty cycle. A wide variety of voltages and configurations will occur to a skilled artisan upon reading this specification and are intended.

Each citation to art is specifically incorporated by reference in their entirety. In particular, citations to network art, algorithms used, and hardware used for routing, discovery of network connections, updating, and optimizing for maximum data flow in a network are especially incorporated. Data flow concepts and their use for decision making, recording at network nodes for routing decisions and the like are also incorporated with the concept of data flow replaced with electricity flow. Information management (two way queries) described in those references are incorporated in the context of use of a parallel microprocessor based node performance management, with current flow replacing the flow of information.

Space limitations preclude further description of embodiments that readily will occur to a skilled artisan. All such embodiments especially in combinations and possible circuit permutations are intended within the ambit of the attached claims and future amended claims. A patent application entitled "Optimum use of solar electricity" filed by the inventor and published on Dec. 12, 2013 publication number 20130327077 on this topic and which is pending is specifically referred to and incorporated by reference in its entirety.

I claim:

1. A direct current electric power grid having multiple local connection points each of which locally sense grid voltage at the connection points, wherein a defined target voltage is used at one or more connection points such that when a connection sensed grid voltage is higher than the target voltage the grid condition at the connection point is HIGH and when the connection sensed grid voltage is lower than the target voltage the grid condition at the connection point is LOW;

the grid comprising:
at each of at least two connection points at separate locations: a high priority load and a low priority load; and
at least two solar electric power input connection points;
wherein when the connection point is LOW the connection point provides power from the grid to the high priority load but not the low priority load, and when the connection point is HIGH, the connection point provides power from the grid to both the high priority load and the low priority load, and
wherein one or more nodes contain a current governor that limits current passing through wires from the one or more nodes to adjacent nodes by decreasing a pulsed duty cycle of the power passing through the wires, in response to sensed high current in the wires that approaches or exceeds a threshold current value.

2. The grid of claim 1, wherein each of the two solar electric power input connection points provides excess power from the respective connection point to the grid.

3. The grid of claim 1, further comprising a defined maximum voltage and a topping load at one or more connection points that consume more power when the grid voltage at a connection point nears or meets the defined maximum voltage to prevent over-voltage conditions.

4. The grid of claim 3, wherein the topping load is a low priority load.

5. The grid of claim 1, comprising one or more microprocessors that manage grid power flow at a connection point by receiving sensed voltage information and controlling at least one load.

6. The grid of claim 5, wherein the one or more microprocessors controls at least two loads and a power source at a connection point.

7. The grid of claim 1, further comprising a defined maximum voltage and a non-solar power source at a connection point that turns off or decreases power supply to the grid from the non-solar power source when the grid voltage at the connection point nears or meets the defined maximum voltage to prevent over-voltage conditions.

8. The grid of claim 3, wherein the topping load is another electrical grid.

9. The grid of claim 1, wherein if connection sensed grid voltage measured at a node somewhere on the DC power grid drops below the threshold value for that node during power removal by the higher priority user then the power removed by the higher priority user is paused for a delay period, or decreased or both decreased and paused.

10. The grid of claim 9, wherein the delay period is randomly determined.

11. The grid of claim 9, wherein the delay period is increased when the frequency of DC power grid drops below the threshold value increases.

12. The grid of claim 1, wherein one or more nodes contain a current governor that limits current passing through wires from the one or more nodes to adjacent nodes by decreasing a pulsed duty cycle of the power passing through the wires, in response to sensed high current in the wires that approaches or exceeds a threshold current value.

13. A local grid kit for starting or expanding a community based DC electric grid, comprising: a node connection unit that senses local node voltage and responds to the sensed voltage by altering at least one of a connection to a load and a connection to an upload power source, wherein each unit of the grid senses its own local node connection voltage and has its own threshold voltage determination wherein the node connection unit comprises a smart DC outlet that protects accidental powering an inductive load from direct current over at least two wires,
the smart DC outlet comprising: a power connection plug from the at least two wires for a load; a sensor for detecting induction response of the load and a comparator that senses an inductive load by comparing a differential signal obtained from the two wires that indicates an inductive load; and a shut off that interrupts or prevents initiation of DC power to the load upon sensing an inductive load.

14. A local DC electric grid, comprising:
at least two node connection units that sense local node voltage and respond to the sensed voltage by altering at least one of a connection to a load and a connection to an upload power source,
wherein each node connection unit senses its own local node connection voltage and has its own threshold voltage determination, and
wherein each local node connection has a current governor that limits DC current flowing to an adjacent node with a set maximum current based on the wire size used between the local node and the adjacent node.

15. A local grid kit for starting or expanding a community based DC electric grid as described in claim 14, comprising a node connection unit.

16. The local grid kit claim 15, wherein the node connection unit comprises a smart DC outlet that protects accidental powering an inductive load from direct current over at least two wires, the smart DC outlet comprising: a power connection plug from the at least two wires for a load; a sensor for detecting induction response of the load and a comparator that senses an inductive load by comparing a differential signal obtained from the two wires that indicates an inductive load; and a shut off that interrupts or prevents initiation of DC power to the load upon sensing an inductive load.

17. The local DC electric grid of claim 14, wherein a node connection unit comprises a smart DC outlet that protects accidental powering an inductive load from direct current over at least two wires, the smart DC outlet comprising: a power connection plug from the at least two wires for a load; a sensor for detecting induction response of the load and a comparator that senses an inductive load by comparing a differential signal obtained from the two wires that indicates an inductive load; and a shut off that interrupts or prevents initiation of DC power to the load upon sensing an inductive load.

18. A power outlet circuit suitable for the smart DC outlet in the local grid kit described in claim 16, comprising the sensor for detecting induction response of the load and a comparator that senses an inductive load by comparing a differential signal obtained from the two wires that indicates an inductive load; and the shut off that interrupts or prevents initiation of DC power to the load upon sensing an inductive load.

19. A power outlet circuit suitable for the smart DC outlet in the local DC electric grid described in claim 17, comprising the sensor for detecting induction response of the load and the comparator that senses an inductive load by comparing a differential signal obtained from the two wires that indicates an inductive load; and the shut off that interrupts or prevents initiation of DC power to the load upon sensing an inductive load.

* * * * *